United States Patent
Xu et al.

(10) Patent No.: US 11,763,100 B2
(45) Date of Patent: Sep. 19, 2023

(54) SYSTEM AND METHOD FOR CONTROLLABLE MACHINE TEXT GENERATION ARCHITECTURE

(71) Applicant: ROYAL BANK OF CANADA, Toronto (CA)

(72) Inventors: Peng Xu, Toronto (CA); Yanshuai Cao, Toronto (CA); Jackie C. K. Cheung, Montreal (CA)

(73) Assignee: ROYAL BANK OF CANADA, Toronto (CA)

( * ) Notice: Subject to any disclaimer, the term of this patent is extended or adjusted under 35 U.S.C. 154(b) by 103 days.

(21) Appl. No.: 16/881,843

(22) Filed: May 22, 2020

(65) Prior Publication Data

US 2020/0372225 A1 Nov. 26, 2020

Related U.S. Application Data

(60) Provisional application No. 62/851,388, filed on May 22, 2019.

(51) Int. Cl.
*G06F 40/56* (2020.01)
*G06F 40/211* (2020.01)
(Continued)

(52) U.S. Cl.
CPC .......... *G06F 40/56* (2020.01); *G06F 40/211* (2020.01); *G06F 40/30* (2020.01); *G06N 3/045* (2023.01); *G06N 3/08* (2013.01)

(58) Field of Classification Search
CPC ........ G06F 40/56; G06F 40/211; G06F 40/30; G06N 3/0454; G06N 3/08; G06N 3/0445; G06N 3/0472; G06N 3/088
See application file for complete search history.

(56) References Cited

U.S. PATENT DOCUMENTS

2004/0044530 A1*  3/2004  Moore ............... G06F 40/45
                                                   704/254
2007/0016401 A1*  1/2007  Ehsani .............. G06F 40/55
                                                   704/9
(Continued)

OTHER PUBLICATIONS

Chen, Mingda, et al. ("A Multi-Task Approach for Disentangling Syntax and Semantics in Sentence Representations." arXiv e-prints (2019): arXiv-1904. https://arxiv.org/pdf/1904.01173.pdf; hereinafter referred to as Chen et al.) (Year: 2019).*

(Continued)

*Primary Examiner* — Pierre Louis Desir
*Assistant Examiner* — Keisha Y. Castillo-Torres
(74) *Attorney, Agent, or Firm* — Norton Rose Fulbright Canada LLP

(57) ABSTRACT

A system is provided comprising a processor and a memory storing instructions which configure the processor to process an original sentence structure through an encoder neural network to decompose the original sentence structure into an original semantics component and an original syntax component, process the original syntax component through a syntax variation autoencoder (VAE) to receive a syntax mean vector and a syntax covariance matrix, obtain a sampled syntax value from a syntax Gaussian posterior parameterized by the syntax mean vector and the syntax covariance matrix, process the original semantics component through a semantics VAE to receive a semantics mean vector and a semantics covariance matrix, obtain a sampled semantics vector from the Gaussian semantics posterior parameterized by the semantics mean vector and the semantics covariance matrix, and process the sampled syntax vector and the sampled semantics vector through a decoder neural network to compose a new sentence.

16 Claims, 11 Drawing Sheets

(51) Int. Cl.
  *G06N 3/08* (2023.01)
  *G06F 40/30* (2020.01)
  *G06N 3/045* (2023.01)

(56) References Cited

U.S. PATENT DOCUMENTS

| | | | | |
|---|---|---|---|---|
| 2015/0325235 | A1* | 11/2015 | Levit | G10L 15/18 704/257 |
| 2016/0350664 | A1* | 12/2016 | Devarajan | G06N 3/084 |
| 2019/0236148 | A1* | 8/2019 | DeFelice | G06N 3/0472 |
| 2020/0279017 | A1* | 9/2020 | Norton | G06F 16/36 |

OTHER PUBLICATIONS

Bao, Yu, et al. "Generating sentences from disentangled syntactic and semantic spaces." arXiv preprint arXiv:1907.05789 (2019). (Year: 2019).*

D. M. Blei, A. Y. Ng, and M. I. Jordan. Latent dirichlet allocation. Journal of machine Learning research, 3(Jan.):993-1022, 2003.

S. R. Bowman, L. Vilnis, O. Vinyals, A. M. Dai, R. Jozefowicz, and S. Bengio. Generating sentences from a continuous space. arXiv preprint arXiv:1511.06349, 2015.

X. Chen, Y. Duan, R. Houthooft, J. Schulman, I. Sutskever, and P. Abbeel. Infogan: Interpretable representation learning by information maximizing generative adversarial nets. In Advances in neural information processing systems, pp. 2172-2180, 2016.

J. Devlin, M.-W. Chang, K. Lee, and K. Toutanova. Bert: Pre-training of deep bidirectional transformers for language understanding. arXiv preprint arXiv:1810.04805, 2018.

I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pp. 2672-2680, 2014.

R. He, W. S. Lee, H. T. Ng, and D. Dahlmeier. An unsupervised neural attention model for aspect extraction. In Proceedings of the 55th Annual Meeting of the Association for Computational Linguistics (vol. 1: Long Papers), pp. 388-397, 2017.

I. Higgins, L. Matthey, A. Pal, C. Burgess, X. Glorot, M. Botvinick, S. Mohamed, and A. Lerchner. beta-vae: Learning basic visual concepts with a constrained variational framework. In International Conference on Learning Representations, vol. 3, 2017.

Z. Hu, Z. Yang, X. Liang, R. Salakhutdinov, and E. P. Xing. Toward controlled generation of text. In Proceedings of the 34th International Conference on Machine Learning—vol. 70, pp. 1587-1596. JMLR. org, 2017.

Zhao, J., Kim, Y., Zhang, K., Rush, A. M., LeCun, Y., et al. Adversarially regularized autoencoders. Proceedings of the 35th International Conference on Machine Learning, 2018.

D. P. Kingma and M.Welling. Auto-encoding variational bayes. arXiv preprint arXiv:1312.6114, 2013.

C. Manning, P. Raghavan, and H. Schütze. Introduction to information retrieval. Natural Language Engineering, 16(1):100-103, 2010.

A. van den Oord, N. Kalchbrenner, and K. Kavukcuoglu. Pixel recurrent neural networks. arXiv preprint arXiv:1601.06759, 2016.

M. E. Peters, M. Neumann, M. Iyyer, M. Gardner, C. Clark, K. Lee, and L. Zettlemoyer. Deep contextualized word representations. arXiv preprint arXiv:1802.05365, 2018.

A. Radford, J. Wu, R. Child, D. Luan, D. Amodei, and I. Sutskever. Language models are unsupervised multitask learners. OpenAI Blog, 1:8, 2019.

T. Shen, T. Lei, R. Barzilay, and T. Jaakkola. Style transfer from non-parallel text by crossaligment. Advances in neural information processing systems, pp. 6830-6841, 2017.

W. Wang, Z. Gan, W. Wang, D. Shen, J. Huang, W. Ping, S. Satheesh, and L. Carin. Topic compositional neural language model. arXiv preprint arXiv:1712.09783, 2017.

T.-H. Wen, D. Vandyke, N. Mrksic, M. Gasic, L. M. Rojas-Barahona, P.-H. Su, S. Ultes, and S. Young. A network-based end-to-end trainable task-oriented dialogue system. arXiv preprint arXiv:1604.04562, 2016.

Z. Yang, Z. Hu, C. Dyer, E. P. Xing, and T. Berg-Kirkpatrick. Unsupervised text style transfer using language models as discriminators. In Advances in Neural Information Processing Systems, pp. 7287-7298, 2018.

Z. Yang, Z. Hu, R. Salakhutdinov, and T. Berg-Kirkpatrick. Improved variational autoencoders for text modeling using dilated convolutions. In Proceedings of the 34th International Conference on Machine Learning—vol. 70, pp. 3881-3890. JMLR. org, 2017.

X. Zhang, J. Zhao, and Y. LeCun. Character-level convolutional networks for text classification. In Advances in neural information processing systems, pp. 649-657, 2015.

Bao, Y., Zhou, H., Huang, S., Li, L., Mou, L., Vechtomova, O., Dai, X., and Chen, J. Generating sentences from disentangled syntactic and semantic spaces. arXiv preprint arXiv:1907.05789, 2019.

Bengio, Y., Courville, A., and Vincent, P. Representation learning: A review and new perspectives. IEEE transactions on pattern analysis and machine intelligence, 35(8): 1798-1828, 2013.

Cifka, O., Severyn, A., Alfonseca, E., and Filippova, K. Eval all, trust a few, do wrong to none: Comparing sentence generation models. arXiv preprint arXiv:1804.07972, 2018.

Fu, Z., Tan, X., Peng, N., Zhao, D., and Yan, R. Style transfer in text: Exploration and evaluation. In Thirty-Second AAAI Conference on Artificial Intelligence, 2018.

He, J., Spokoyny, D., Neubig, G., and Berg-Kirkpatrick, T. Lagging inference networks and posterior collapse in variational autoencoders. arXiv preprint arXiv:1901.05534, 2019.

Hyndman, R. J. Computing and graphing highest density regions. The American Statistician, 50(2):120-126, 1996.

Kumar, A., Sattigeri, P., and Balakrishnan, A. Variational inference of disentangled latent concepts from unlabeled observations. arXiv preprint arXiv:1711.00848, 2017.

Lample, G., Subramanian, S., Smith, E., Denoyer, L., Ranzato, M., and Boureau, Y.-L. Multiple-attribute text rewriting. 2018.

Li, J., Jia, R., He, H., and Liang, P. Delete, retrieve, generate: A simple approach to sentiment and style transfer. arXiv preprint arXiv:1804.06437, 2018.

Logeswaran, L., Lee, H., and Bengio, S. Content preserving text generation with attribute controls. In Advances in Neural Information Processing Systems, pp. 5103-5113, 2018.

Makhzani, A., Shlens, J., Jaitly, N., Goodfellow, I., and Frey, B. Adversarial autoencoders. arXiv preprint arXiv:1511.05644, 2015.

Napoles, C., Sakaguchi, K., Post, M., and Tetreault, J. Ground truth for grammatical error correction metrics. In Proceedings of the 53rd Annual Meeting of the Association for Computational Linguistics and the 7th International Joint Conference on Natural Language Processing (vol. 2: Short Papers), pp. 588-593, 2015.

Papineni, K., Roukos, S., Ward, T., and Zhu, W.-J. Bleu: a method for automatic evaluation of machine translation. In Proceedings of the 40th annual meeting on association for computational linguistics, pp. 311-318. Association for Computational Linguistics, 2002.

Pennington, J., Socher, R., and Manning, C. Glove: Global vectors for word representation. In Proceedings of the 2014 conference on empirical methods in natural language processing (EMNLP), pp. 1532-1543, 2014.

Peters, J., Janzing, D., and Scholkopf, B. Elements of causal inference: foundations and learning algorithms. MIT press, 2017.

Radford, A., Jozefowicz, R., and Sutskever, I. Learning to generate reviews and discovering sentiment. arXiv preprint arXiv:1704.01444, 2017.

Razavi, A., Oord, A. v. d., Poole, B., and Vinyals, O. Preventing posterior collapse with delta-vaes. arXiv preprint arXiv:1901.03416, 2019.

Rezende, D. J. and Viola, F. Taming vaes. arXiv preprint arXiv:1810.00597, 2018.

Singh, G., Memoli, F., and Carlsson, G. E. Topological methods for the analysis of high dimensional data sets and 3d object recognition. 2007.

(56) References Cited

OTHER PUBLICATIONS

Sudhakar, A., Upadhyay, B., and Maheswaran, A. Transforming delete, retrieve, generate approach for controlled text style transfer. arXiv preprint arXiv:1908.09368, 2019.
Tomczak, J. M. and Welling, M. Vae with a vampprior. arXiv preprint arXiv:1705.07120, 2017.
Van Veen, H., Saul, N., Eargle, D., and Mangham, S. Kepler mapper: A flexible python implementation of the mapper algorithm. Journal of Open Source Software, 4(42):1315, 2019.

* cited by examiner

SYSTEM AND METHOD FOR CONTROLLABLE MACHINE TEXT GENERATION ARCHITECTURE

CROSS REFERENCE TO RELATED APPLICATIONS

This application is a non-provisional of, and claims all benefit, including priority to US Application No. 62/851,388, dated 22 May 2019, entitled SYSTEM AND METHOD FOR CONTROLLABLE MACHINE TEXT GENERATION ARCHITECTURE, incorporated herein in its entirety by reference.

FIELD

The present disclosure relates generally to machine learning, and in particular to a system and method for controllable machine text generation architecture.

INTRODUCTION

High-dimensional data, such as images and text, are often generated through the interaction of many complex factors, such as lighting and pose in images or style and content in texts. Recently, Variational Autoencoders (VAEs) and other unsupervised generative models have found successes in modelling the manifold of natural images. These models often discover controllable latent factors that allow manipulation of the images through conditional generation from interpolated or extrapolated latent codes, often with impressive quality. On the other hand, while various attributes of text such as sentiment and topic can be discovered in an unsupervised way, manipulating the text by changing these learned factors has not been possible with unsupervised generative models. It has been observed that text manipulation is generally more challenging compared to images, and the successes of these models cannot be directly transferred to texts.

Controllable text generation aims to generate realistic text with control over various attributes including sentiment, topic, and other high-level properties. The possibility of unsupervised controllable text generation could help in a wide range of applications such as dialogues systems. Existing approaches rely on supervised learning from annotated attributes to generate the text in a controllable fashion. The requirement of labelled data largely restricts the range of applications of these models, since there are only limited annotated data for some specific domains with a fixed set of predefined attributes. The high cost of labelling large training corpora with attributes of interest limits the usage of these models, as pre-existing annotations often do not align with desired downstream goals. Even if cheap labels are available, for example, review scores as a proxy for sentiment, the control is limited to the variation defined by the attributes.

SUMMARY

In one embodiment, there is provided a system for machine text generation. The system comprises at least one processor and a memory storing instructions which when executed by the processor configure the processor to process an original sentence structure through an encoder neural network to decompose the original sentence structure into an original semantics component and an original syntax component, process the original syntax component through a syntax VAE to receive a syntax mean vector and a syntax covariance matrix, obtain a sampled syntax value from a syntax Gaussian posterior parameterized by the syntax mean vector and the syntax covariance matrix, process the original semantics component through a semantics VAE to receive a semantics mean vector and a semantics covariance matrix, obtain a sampled semantics vector from the Gaussian semantics posterior parameterized by the semantics mean vector and the semantics covariance matrix, and process the sampled syntax vector and the sampled semantics vector through a decoder neural network to compose a new sentence. The semantics mean vector is constrained to a simplex associated with a semantics Gaussian posterior and learned during training of a sentence model.

In another embodiment, there is provided a method of machine text generation. The method comprises processing an original sentence structure through an encoder neural network to decompose the original sentence structure into an original semantics component and an original syntax component, processing the original syntax component through a syntax VAE to receive a syntax mean vector and a syntax covariance matrix, obtaining a sampled syntax value from a syntax Gaussian posterior parameterized by the syntax mean vector and the syntax covariance matrix, processing the original semantics component through a semantics VAE to receive a semantics mean vector and a semantics covariance matrix, obtaining a sampled semantics vector from the Gaussian semantics posterior parameterized by the semantics mean vector and the semantics covariance matrix, and processing the sampled syntax vector and the sampled semantics vector through a decoder neural network to compose a new sentence. The semantics mean vector is constrained to a simplex associated with a semantics Gaussian posterior and learned during training of a sentence model.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Figure 1:
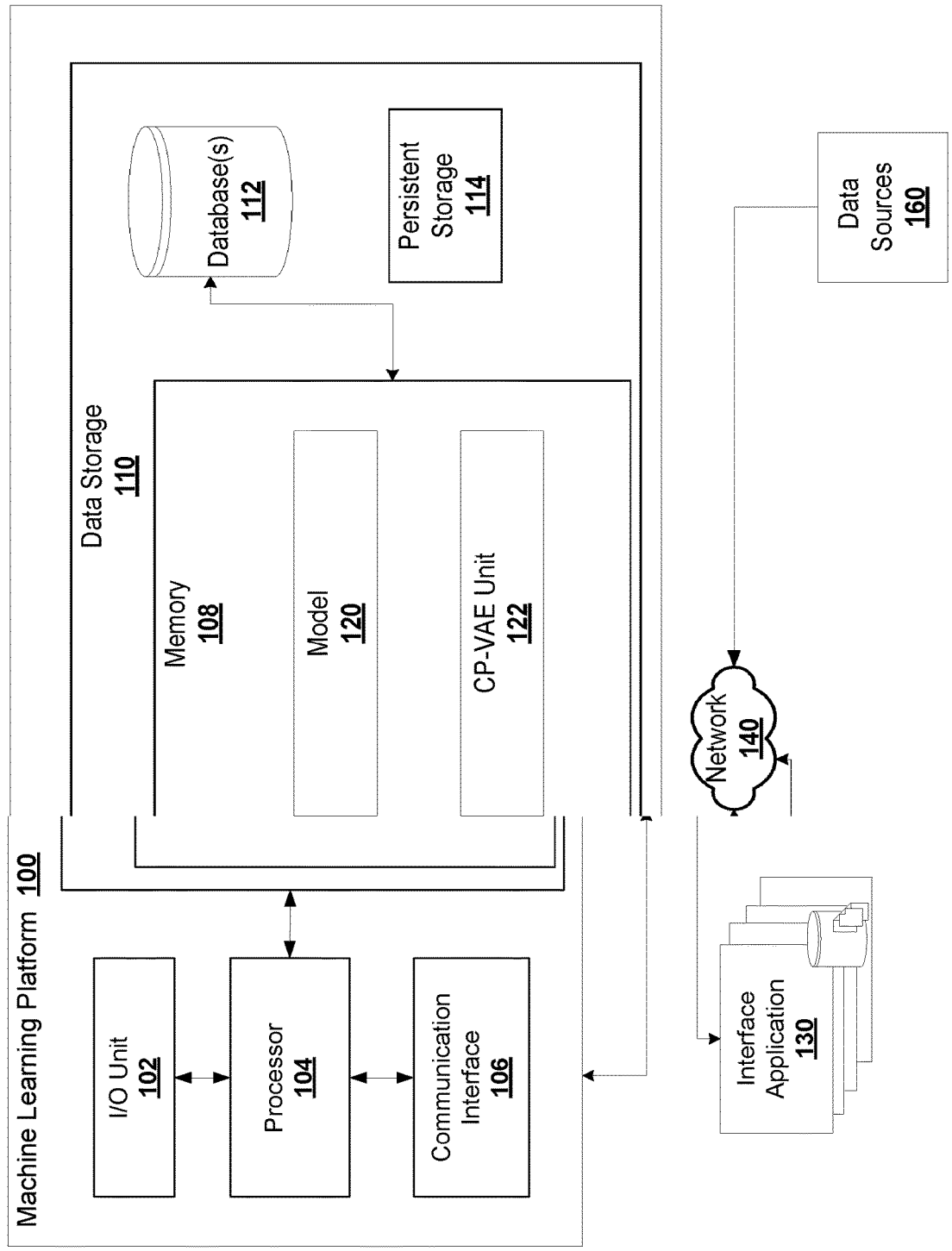
FIG. 1 illustrates, in a schematic diagram, an example of a physical environment for a machine learning platform, in accordance with some embodiments.

Embodiments of methods, systems, and apparatus are described through reference to the drawings.

Variational autoencoders are built using machine learning data architectures, such as neural networks, and, for example, can include encoders and decoders which are trained over a number of epochs to generate outputs that can match or represent a similar probability distribution as a set of input data samples. The training can be based on various loss functions, and minimization thereof across training epochs. The variational autoencoder (VAE) can learn parameters of a probability distribution representing the input data, and, accordingly, can be usable to generate new input data samples.

Recently, large-scale pre-training with generative models on language achieved success on various tasks including generating coherent text. By conditioning on certain observed text, these pre-trained models can also perform some degree of control over text generation. However, these models are essentially black-boxes. The control over the generated text using seed sentences is weak, unpredictable and often uninterpretable.

Some obstacles prevent sequence VAEs from performing well in unsupervised controllable text generation. Manipulating the latent factors for typical semantic variations often leads to latent codes that reside in some low-density region of the aggregated posterior distribution. In other words, there are vacant regions in the latent code space not being considered by the decoding network, at least not at convergence. As a result, the decoding network is unable to process such manipulated latent codes, yielding unpredictable generation results of low quality. Topological data analysis provides direct evidence that shows that this vacancy problem is more severe for VAEs trained on text than image.

In some embodiments, VAEs are used as the backbone for controllable and interpretable generation of text without supervision. Instead of depending on annotated attributes, the underlying high-level semantic variations are to be discovered and disentangled automatically during the training. The resulting latent variables allow flexible and interpretable controlled generation.

There are some challenges in using VAEs as the backbone for controllable and interpretable generation of text without supervision. First, information about topics, semantics and syntax are highly intertwined in language. Second, jointly discovering such variation while generating texts that exhibit them requires learning about how to "entangle" the factors after disentangling them, which poses another level of difficulty.

In order to mitigate the latent vacancy problem on text, the posterior mean may be constrained to a learned probability simplex and only manipulation within the probability simplex is performed, which is referred as Constrained Posterior VAE (CP-VAE). Two regularizers are added to the original objective of VAE. The first enforces an orthogonal structure of the learned probability simplex; the other encourages this simplex to be filled without holes. Besides confirming that latent vacancy is indeed a cause of failure in previous sequence VAEs', CP-VAE is also a successful attempt towards unsupervised learning of controllable representations for text. Experimental results on text style transfer show that our method outperforms unsupervised baselines and strong supervised approaches, whose decoding network are trained from scratch. Without supervision and the help of pre-training for generation, the method described herein achieves comparable results with state-of-the-art supervised approaches leveraging large-scale pre-trained models for generation, with respect to the automatic evaluation metrics used in text style transfer. The proposed framework described herein also enables finer-grained and more flexible control over text generation. In particular, a topic may be switched in the middle of sentence generation, and the model will often still find a way to complete the sentence in a natural way.

In some embodiments, there is a framework based on VAEs to do unsupervised controllable text generation while addressing the above problems effectively. The latent code of the VAE may be decomposed into two parts: a structured latent space to capture the dominant variations in the dataset, whether it is topic, sentiments or other unknown factors; and a second unstructured continuous latent space to capture information used to generate natural and fluent sentences. In order to discover and disentangle the underlying semantic variation, in the structured latent space, the inferred latent code may be projected onto a learnable low-rank subspace. A reconstruction loss and a regularization term to encourage orthogonality may be introduced to make the basis of the subspace reflect the dominant variation in the data. Enforcing this structured constraint may also prevent posterior collapse in the sequence VAE.

Experimental results show that the unsupervised approach described herein (interchangeably referred to herein as the structured/unstructured sequence VAE (SUS-VAE) or the CP-VAE) outperforms previous supervised approaches significantly on the task of sentiment transfer, and achieves better results on the task of topic modelling as compared to strong unsupervised baselines. In addition, two novel ways of controlled text generation are provided, performed by the unsupervised approach described herein which are beyond the capabilities of existing approaches. For sentiments, the unsupervised approach described herein (CP-VAE/SUS-VAE) can discover a neutral sentiment besides the traditional binarized sentiment, even if it is not explicitly labelled in the data, and perform style transfer based on this sentiment. For topics, generation can be controlled in real time with natural topic transition by switching among different discovered topics.

FIG. 1 illustrates, in a schematic diagram, an example of a physical environment for a machine learning platform 100, in accordance with some embodiments. The platform 100 may be an electronic device connected to interface application 130 and data sources 160 via network 140. The platform 100 can implement aspects of the processes described herein for controllable machine text generation architecture.

The platform 100 may include a processor 104 and a memory 108 storing machine executable instructions to configure the processor 104 to receive a neural network (from e.g., data sources 160). The processor 104 can receive a trained neural network and/or can train a neural network using training engine 124. The platform 100 can include an I/O Unit 102, communication interface 106, and data storage 110. The processor 104 can execute instructions in memory 108 to implement aspects of processes described herein.

The platform 100 may be implemented on an electronic device and can include an I/O unit 102, a processor 104, a communication interface 106, and a data storage 110. The platform 100 can connect with one or more interface devices 130 or data sources 160. This connection may be over a network 140 (or multiple networks). The platform 100 may receive and transmit data from one or more of these via I/O unit 102. When data is received, I/O unit 102 transmits the data to processor 104.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

The data storage 110 can include memory 108, database(s) 112 and persistent storage 114. Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g., graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities.

The data storage 110 may be configured to store information associated with or created by the platform 100. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, etc.

The memory 108 may include a model 120, and a CP-VAE (or SUS-VAE) unit 122. The model and the CP-VAE unit 122 will be described in more detail below. It should be noted that the terms "CP-VAE" and "SUS-VAE" are used interchangeably.

In some embodiments, the backbone of a CP-VAE framework may comprise variational encoders (VAEs) in which the generated text is conditioned on some latent code z. A variational autoencoder (VAE) is a generative model defined by a prior $p(z)$ and a conditional distribution $p_\theta(x|z)$. For example, given observed text x, the VAE may be trained to optimize a tractable variational lower bound of $\log p_\theta(x)$, The VAE is trained to optimize a tractable variational lower bound of $\log p_\theta(x)$:

$$L_{VAE}(x, \theta, \phi) = E_{z \sim q_\phi(z|x)}[\log p_\theta(x|z)] - D_{KL}(q_\phi(x|x) \| p(z)), \qquad (1)$$

where $q_\phi(z|x)$ is a variational distribution parameterized by an inference network or an encoding network with parameters $\phi$, and $p_\theta(x|z)$ denotes the generator or decoding network with parameters $\theta$. This objective or lower bound tries to minimize the reconstruction error of observed text to generate the data, and at the same time regularize $q_\phi(z|x)$ towards the prior $p(z)$. In some embodiments, $p(z)$ may be chosen as $N(0, I)$. For text modelling, the input x is some observed text. Both the encoding and decoding network are usually recurrent neural networks, and the model is called a sequence VAE.

There are many factors entangled in the language. Limited success has been achieved to distill high-level semantics by an unstructured latent code z alone. In order to make this process easier, low-level syntax and high-level semantics are decomposed by splitting z into two parts: $z^{(1)}$ and $z^{(2)}$. The first part tries to capture the high-level semantics implicitly represented in the text; while the second part learns to encode the rest into useful information. As a result, $q_\phi(z|x)$ is decomposed into $q_{\phi_1}(z^{(1)}|x)q_{\phi_2}(z^{(2)}|x)$ where $\phi = \phi_1 \cup \phi_2$.

Note that during learning, the decoding network $p_\theta(x|z)$ only learns to decode z that are sampled from $q_\phi(z|x)$. In other words, the decoding network is never trained to decode the entire latent space. Instead, it only learns to process z sampled from the aggregated posterior distribution $q_\phi(z) = E_{x \sim p_d(x)} q_\phi(z|x)$, where $p_d(x)$ is the training data distribution. As will be seen below, if $q_\phi(z)$ has regions of low density, there is no guarantee that $p_\theta$ would generalize well to such places.

Figure 2A:
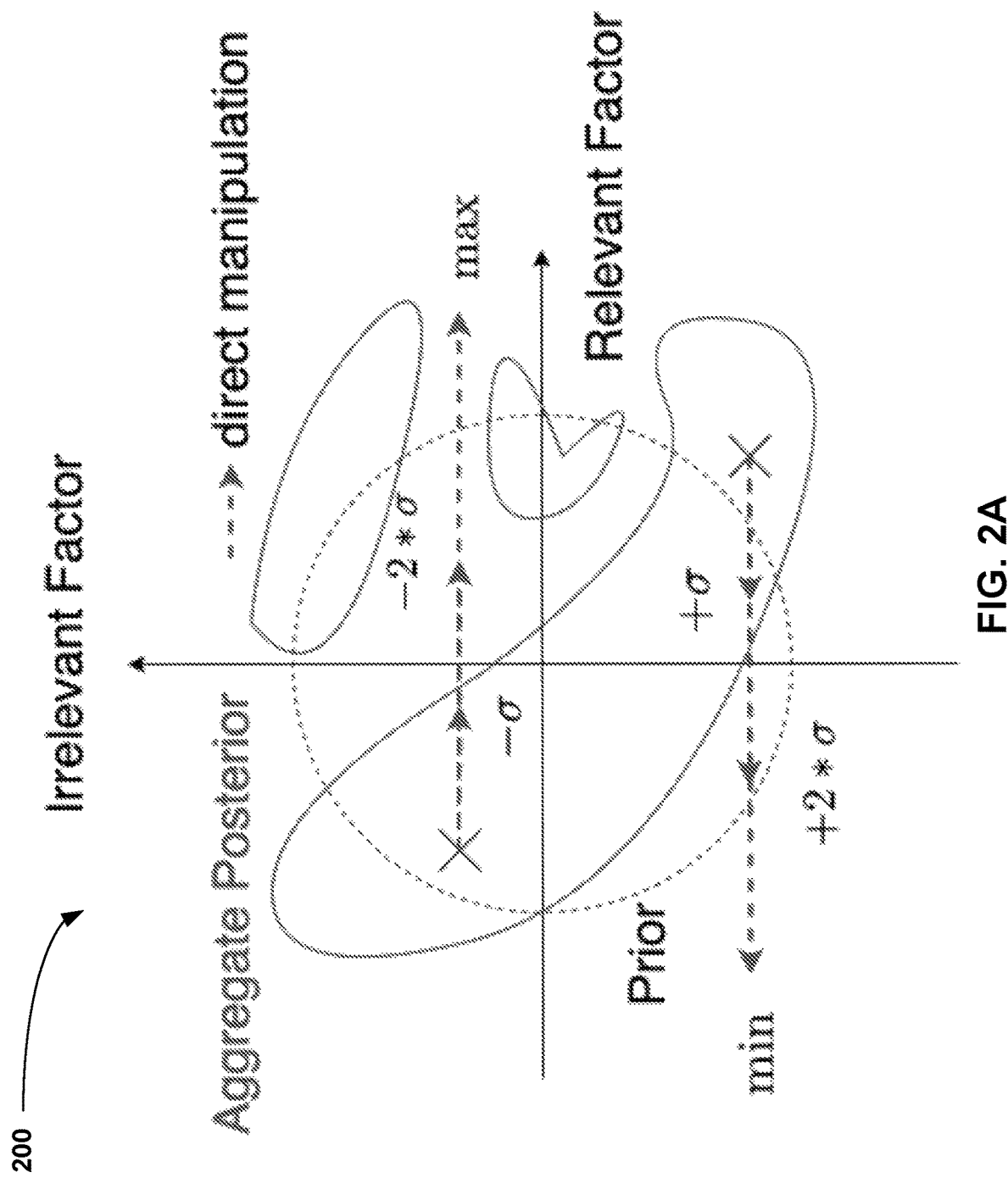
FIG. 2A illustrates, in a graph, why latent vacancy prevents effective manipulation in VAEs.

It is hypothesized that when trained on text data, the aggregated posterior of sequence-VAEs tend to have vacant regions of low density, whereto the decoder may fail to generalize. The decoder could generalize to the vacant regions without ever seeing training examples, but there is no guarantee it can perform well in this case especially if the such vacancy is large. FIG. 2A illustrates, in a graph 200, why latent vacancy prevents effective manipulation in VAEs. The aggregated posterior shown has multiple disconnected areas and direct manipulations of the relevant factor may fall into vacant regions of low density.

An exploratory study on unsupervised sentiment manipulation was conducted, and evidence from two different aspects to verify the above-mentioned hypothesis is provided. First, how the negative log-likelihood of latent codes under the aggregated posterior changes are measured before and after manipulation. Second, since topology is the technical language to describe the notion of vacant regions or holes, topological data analysis is employed to confirm the exacerbation of latent vacancy problem on text as compared to images. A preview of the proposed method (later formally introduced herein), and a demonstration that it avoids the latent vacancy problem using the same analyses, is now provided.

Figure 2B:
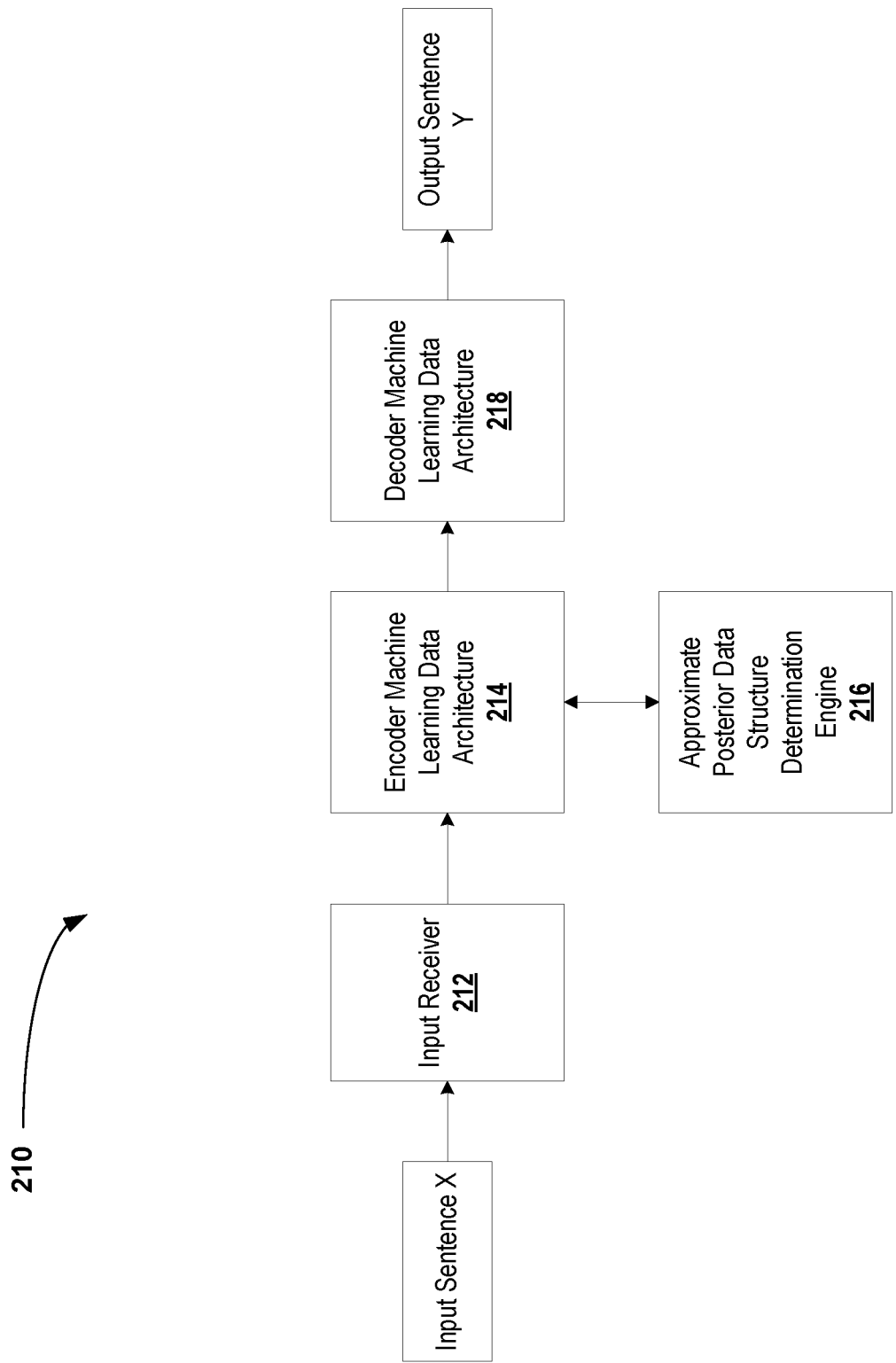
FIG. 2B is a block schematic diagram of a VAE, in accordance with some embodiments.

FIG. 2B is a block schematic diagram of an example VAE system 210, in accordance with some embodiments. The CP-VAE unit 122 may implement one or more instances of the VAE 210. In FIG. 2B, variational autoencoder system 210 is shown that is configured for conducting text machine learning, according to some embodiments. An input sentence is received at input receiver 212. A encoder machine learning data architecture 214 is configured to receive the input sequence to decompose series of semantics components and syntax components. An approximate posterior data structure determination engine 216 is configured to extract from each semantics component and each syntax component, a mean and a variance parameter, and to encapsulate the mean and the variance parameters from each semantics component and each syntax component as an approximate posterior data structure. A decoder machine learning data architecture 218 is configured to generate new sentences based on the approximate posterior data structure and the series of semantics components and syntax components from the encoder machine learning data architecture. The output sentences can be adapted to be similar to the input sentence or in some embodiments, generated as new sentences that are based on properties of the input sentences but are distinct (e.g., non-identical).

Figure 3:
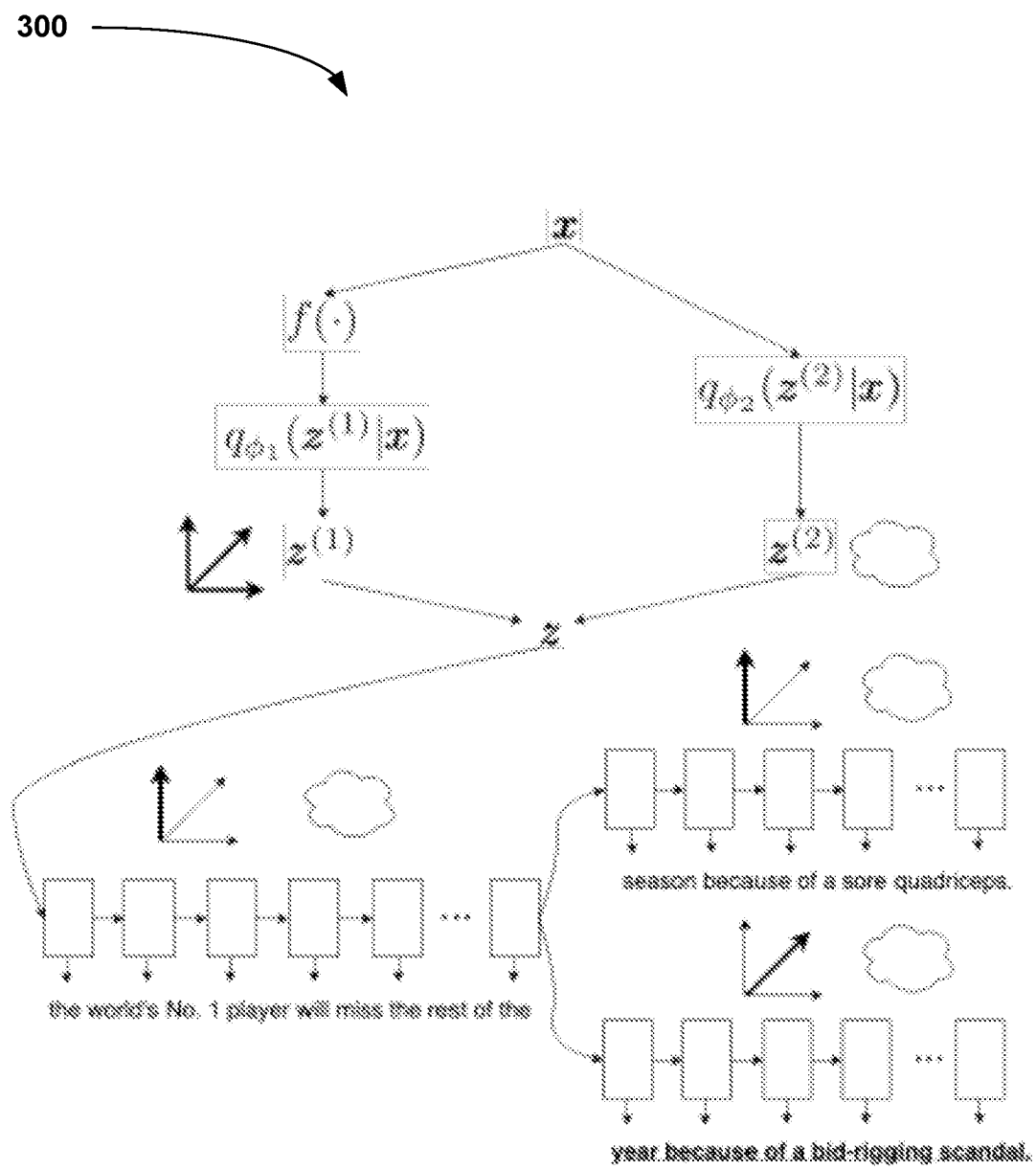
FIG. 3 illustrates an example of an architecture for text generation, in accordance with some embodiments.

FIG. 3 illustrate examples of a CP-VAE architecture 300 for text generation, in accordance with some embodiments.

In order to perform controllable text generation, previous methods assume that text datasets have either annotated (one or more) attributes or multiple text datasets with different known styles. However, the cost in labeling large training corpora with attributes of interest limits the usage of these methods, except occasionally where some pre-existing annotation aligns with the goal (for example, review scores as proxy for sentiment). Even where the label or annotated data can be obtained at a relatively low cost, the control over text generation for these methods are limited to variation defined by the attributes.

In some embodiments described herein, the CP-VAE architecture or framework 300 uses raw text without any annotated attribute. The underlying dominating semantic variations in the given corpus may be discovered and disentangled automatically by the CP-VAE framework 300. In some embodiments, the CP-VAE framework 300 does not have inductive bias regarding which attributes perform the training. This framework 300 allows for the generation of natural textual outputs with control over high-level semantic meanings by manipulating the semantic variations learnt.

Figure 4A:
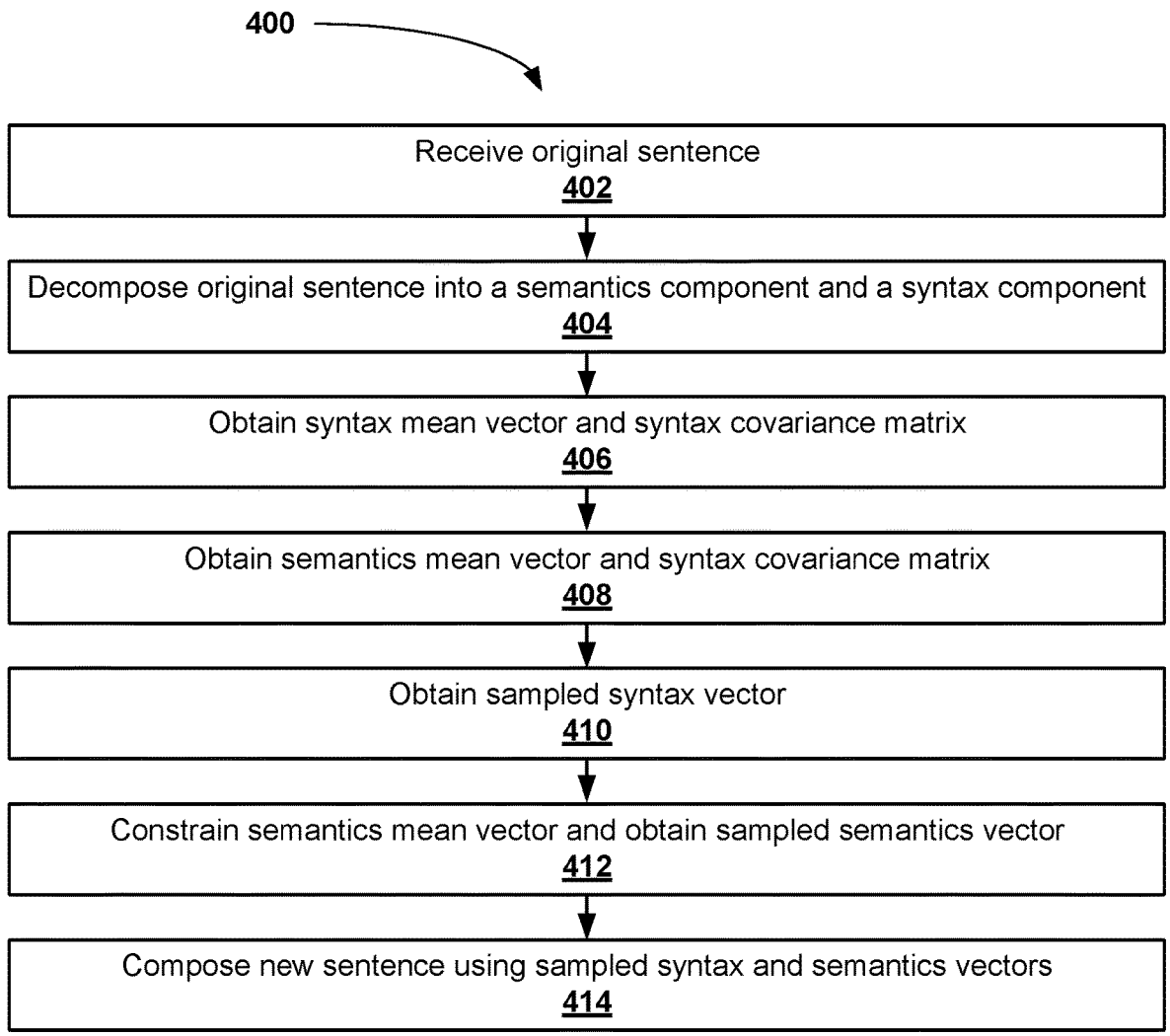
FIG. 4A illustrates, in a flowchart, an example of a method of text generation, in accordance with some embodiments.

FIG. 4A illustrates, in a flowchart, an example of a method of text generation 400, in accordance with some embodiments. The method 400 comprises receiving an original sentence 402 and processing the original sentence structure through an encoder neural network to decompose 404 the original sentence structure into an original semantics component and an original syntax component. The original syntax component is processed through a syntax variational autoencoder (VAE) to obtain 406 a syntax mean vector and a syntax covariance matrix. A sampled syntax vector is obtained 410 from a syntax Gaussian posterior parameterized by the syntax mean vector and the syntax covariance matrix. The original semantics component is processed through a semantics VAE to obtain 408 a semantics mean vector and a semantics covariance matrix. The semantics mean vector is from a semantics Gaussian posterior associated with the semantics VAE, and is constrained 412 to a simplex (associated with the semantics Gaussian posterior) learned during training of a sentence model. A sampled semantics vector is obtained 412 from the semantics Gaussian posterior parameterized by the semantics mean vector and the semantics covariance matrix. The sampled syntax vector and the sampled semantics vector are concatenated and processed through a decoder neural network to compose 414 a new, reconstructed, sentence.

Other steps may be added to the method 400, including training a sentence model, displaying classification groupings associated with aggregate loss values of each reconstructed training sentence, assigning a label for each classification grouping, receiving a semantics input value defining a variation parameter used to vary the original sentence, displaying options for the sentiment value and the topic value, and outputting the new sentence. The semantics input value, and the classification groupings, may comprise at least one of a sentiment value and/or a topic value. In some embodiments, a user may select a topic or sentiment from a selection menu to indicate that the original sentence is to manipulated based on the semantic category corresponding to topic or sentiment. In some embodiments, the classification labels are assigned by a subject matter expert. Details regarding the method 400 will be further described below.

Figure 4B:
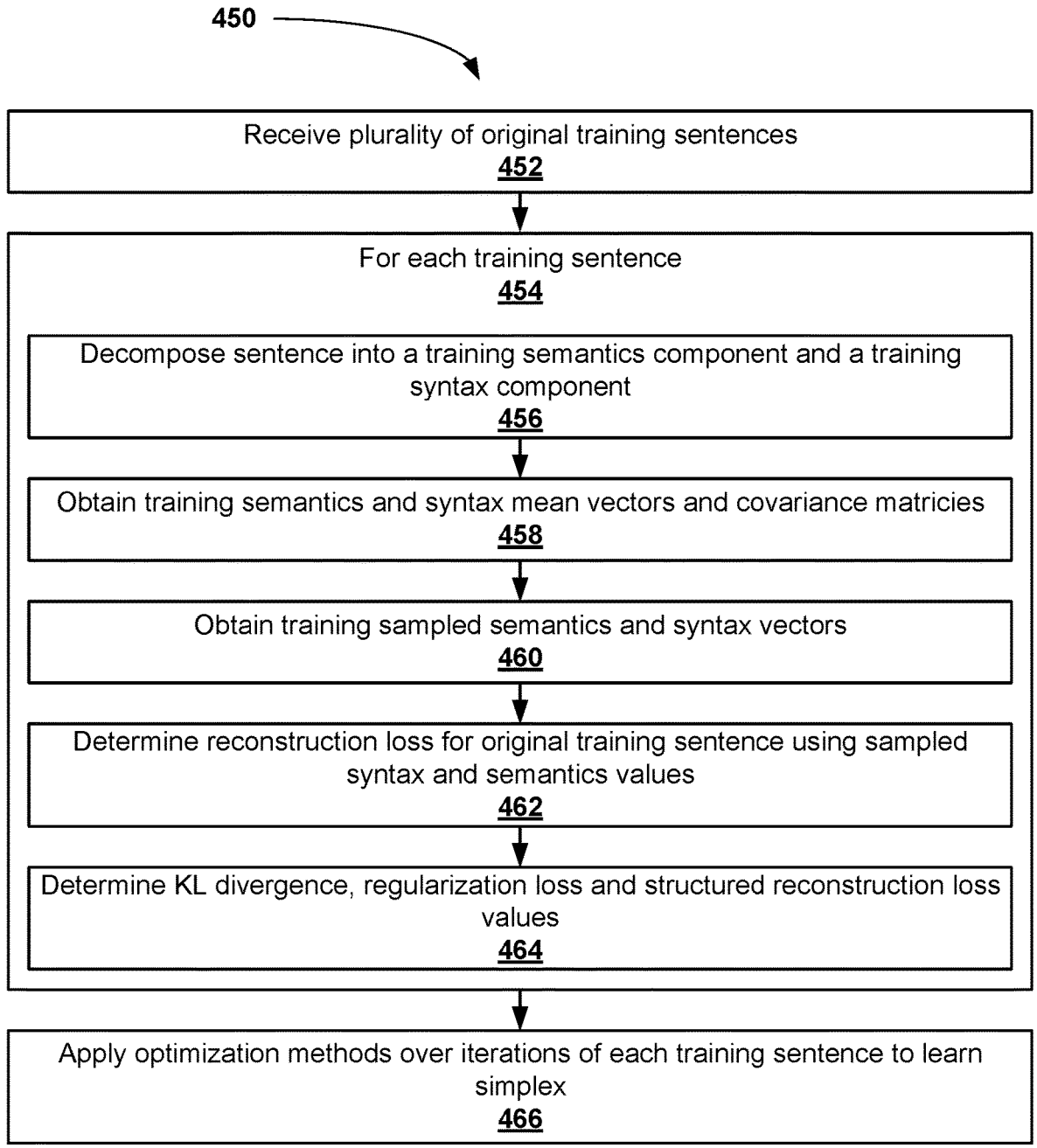
FIG. 4B illustrates, in a flowchart, an example of a method of training a model for text generation, in accordance with some embodiments.

FIG. 4B illustrates, in a flowchart, an example of a method of training a model 450 for text generation, in accordance with some embodiments. The method 450 comprises receiving 452 a plurality of training sentence structures. For each training sentence structure 454, several steps may be performed. Each training sentence structure may be processed through an encoder neural network to decompose 456 that training sentence structure into a training semantics component and a training syntax component. The training syntax component may be processed through the syntax VAE to obtain 458 a training syntax mean vector and a training syntax covariance matrix. A sampled training syntax vector is obtained 460 from a syntax Gaussian posterior parameterized by the training syntax mean vector and the training syntax covariance matrix. The training semantics component may be processed through the semantics VAE to obtain 458 a training semantics mean vector and a training semantics covariance matrix. A sampled training semantics vector is obtained 460 from a semantics Gaussian posterior parameterized by the training semantics mean vector and the training semantics covariance matrix. The sampled training syntax vector and the sampled training semantics vector are concatenated and passed through a decoder neural network to obtain 462 a reconstruction loss value for the original training sentence based on the sampled vectors. Next, a KL divergence value, a regularization loss value and a structured reconstruction loss value may be determined 464 as further described below. Such losses are calculated for each training sentence, over several iterations (i.e., different sampled vectors can be obtain for the same training sentence over different iterations). Machine learning optimization methods, such as SGD, are applied 466 during the multiple iterations for each learning sentence to minimize such losses. By minimizing the regularization loss value and the structured reconstruction loss value, the semantic mean vectors associated with a semantic Gaussian posterior will be constrained to a simplex. As such, the model learns the simplex using the method 450. Other steps may be added to the method 450. Details regarding the method 450 will be further described below.

Unsupervised Sentiment Manipulation

The setup used to discover a sentiment latent dimension and subsequent exploration of manipulating the sentiment attribute is provided. Note that discovering sentiment feature in an unsupervised way is known to be possible in large-scale language models. However, limited success has been achieved for sequence VAE and its variants to change text attributes while preserving the relevant content, without annotated labels.

To perform unsupervised sentiment manipulation, a restaurant reviews dataset was used. A β-VAE was trained with state of the art aggressive training of the encoder, and a significant improvement over vanilla sequence VAEs. The model under study here has a latent space of 80 dimensions with a long short term memory (LSTM) encoder and decoder, with a β of 0.35. By inspecting the accuracy on the validation set, it was found that there exists one dimension of latent code, $z_{[s]}$, achieving around 80% sentiment classification accuracy by its value alone, while other latent codes get accuracy around 50%. This means that this latent dimension is an effective sentiment indicator.

In one embodiment, the β-VAE used for the unsupervised sentiment manipulation includes an LSTM encoding network and a LSTM decoding network. For the encoding network, the input size may be 256, and the hidden size may be 1,024. For the decoding network, the input size may be 256, the hidden size may be 1,024, and dropouts with probability 0.5 may be applied on after the embedding layer and the LSTM layer in the decoding network. β may be chosen as 0.35, the dimension for the latent code may be 80, and the batch size may be 32. A stochastic gradient descent (SGD) may be used with learning rate 1.0 to update the parameters for both the encoding and the decoding network. The model may be trained until the reconstruction loss stops decreasing. The encoding network may be aggressively trained. The hyperparameters may be chosen following the experiments conducted as described herein without extra tuning.

In some embodiments, to identify the latent factor indicating the sentiment, the value of each latent code may first be normalized by subtracting the mean estimated over all the training samples. Then the polarity of each latent code may be used to classify the sentiment in the validation set. The one with the highest accuracy is identified as the latent factor indicating the sentiment.

When attempts are made to try to perform sentiment manipulation by modifying the latent dimension, the decoding network may fail to generate desirable outputs most of the time. To ensure that the magnitude of manipulation suffices to change the sentiment of generated text, multiple magnitudes were attempted by moving z[s].

(1) by σ,
(2) by 2*σ,
(3) to $\min(z_{[s]})$ or $\max(z_{[s]})$, where σ, min, max are the standard deviation, the minimum and the maximum estimated on all the training samples.

Figure 5A:
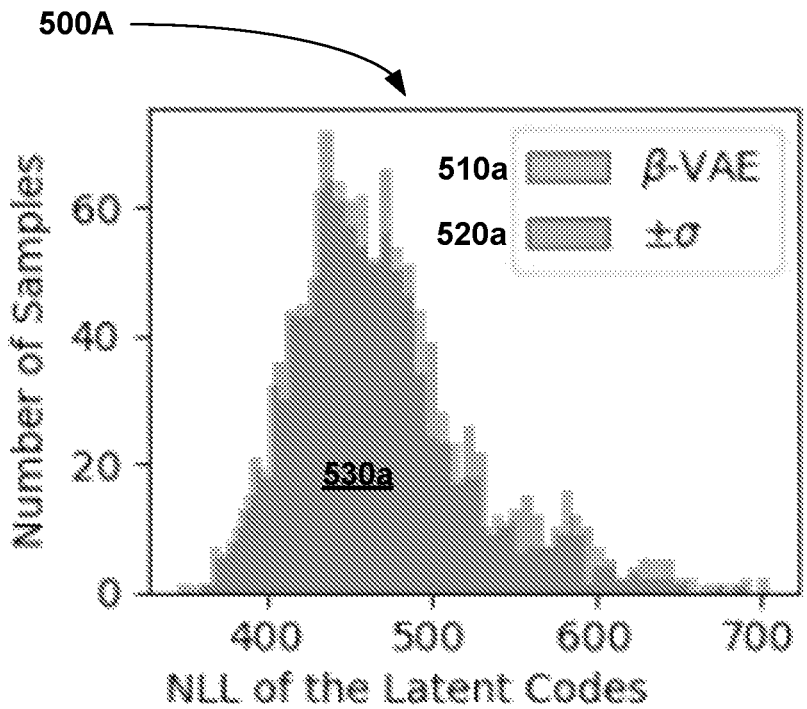
FIGS. 5A to 5D illustrate, in graphs, histograms of test sample negative log-likelihood (NLL) under the aggregated posterior, considering their original latent codes and manipulated ones, in accordance with some embodiments.
Figure 5B:
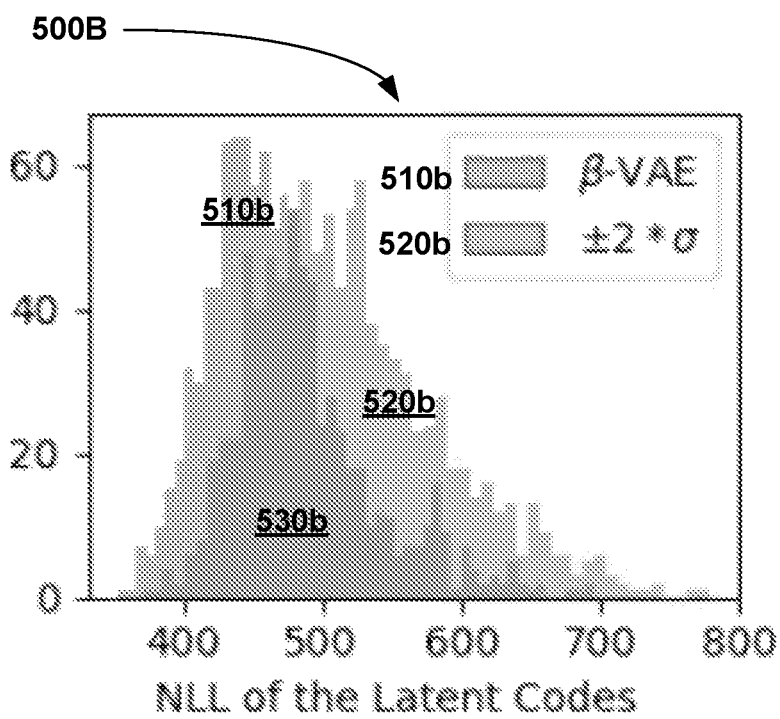
Figure 5C:
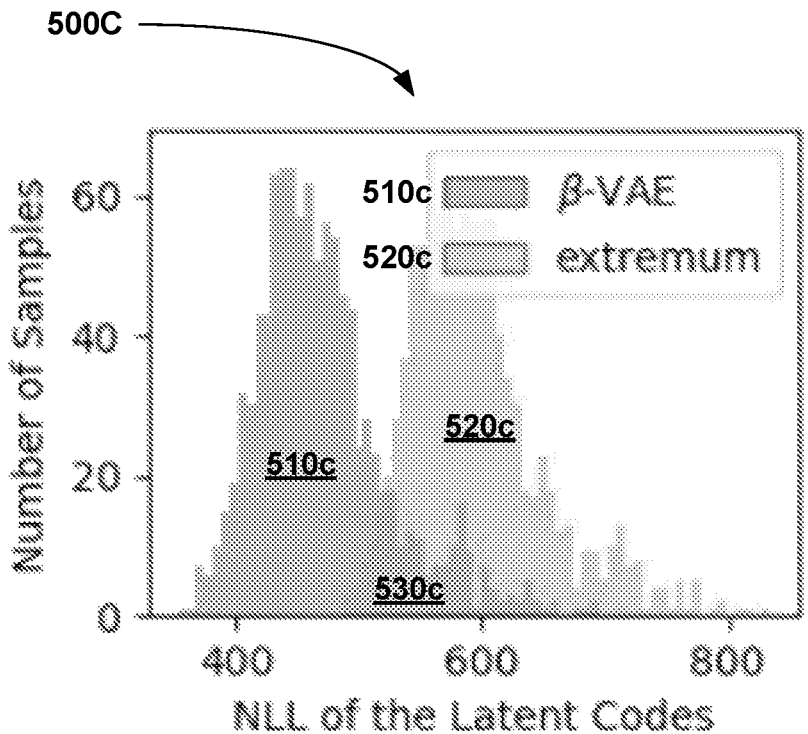
Figure 5D:
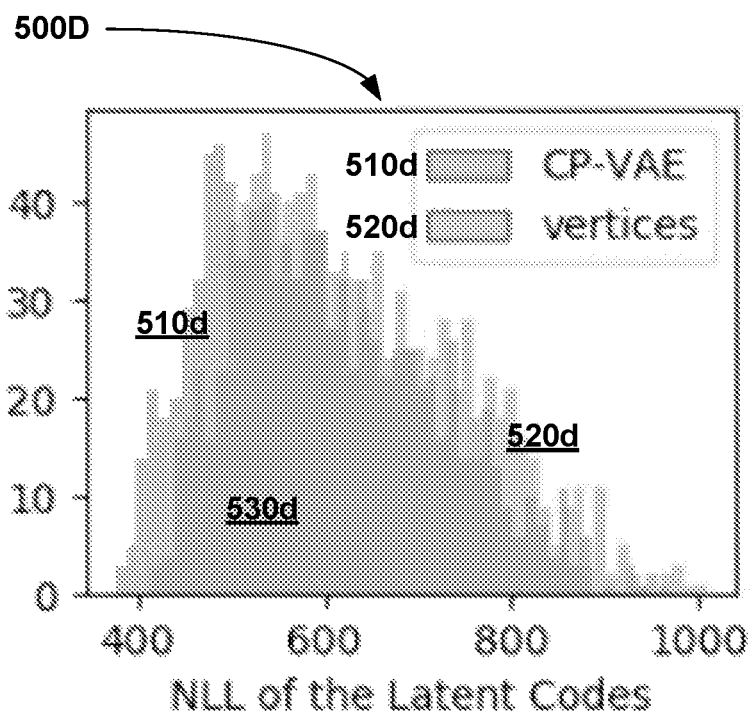

The manipulation is conducted as illustrated in FIG. 2. The generated sentences were inspected with the manipulated codes to check whether they are transferred to the desired style successfully (transfer strength) and whether they are still relevant to the source sentence (content preservation). The behaviours of β-VAE with aggressive training are summarized in Table 1, along with one randomly selected example for the purpose of illustration. Although the sentiment can be flipped as the magnitude of the manipulations is increased, the transformed texts become irrelevant to the original text, meaning the content information in the latent code is ignored by the decoder. On the other hand, when the manipulation on $z_{[s]}$ is small as in FIG. 5A, β-VAE is unable to flip the sentiment of the transformed text, like the example in Table 1. Detailed quantitative evaluations are presented herein in the Comparisons with Unsupervised Baselines section.

TABLE 1

Summary of the behaviours of β-VAE with aggressive training and CP-VAE

|  | Example | Transfer Strength | Content Preservation | NLL Discrepancy |
| --- | --- | --- | --- | --- |
| Source sentence | the pizza is offered without toppings and it's lacking in flavor. | — | — | — |
| β-VAE w. aggr training (±σ) | the pizza is offered in toppings and it's lacking in pittsburgh sauce. | Weak | Good | Small |
| β-VAE w. aggr training (±2*σ) | the pizza is more than fresh and your food is lacking in flavor | Medium | Medium | Medium |
| β-VAE w. aggr training (extremum) | the service is a great cut and the food is top notch in charlotte. | Strong | Bad | Large |
| CP-VAE | the pizza is full of spicy and it's delicious. | Strong | Good | Small |

Table 1 shows a summary of the behaviours of β-VAE with aggressive training and the proposed CP-VAE described herein. Detailed quantitative evaluations for transfer strength and content preservation are presented in Table 3.

NLL of the Codes under the Aggregated Posterior

To verify the hypothesis of vacant regions, the negative log-likelihood (NLL) of test samples' original latent codes as well as the manipulated ones, were first compared under the aggregated posterior. An increase of the NLL after manipulation would indicate that the new codes land in regions of lower density. The aggregated posterior of the trained VAE is estimated with a large mixture of Gaussians where each component is the Gaussian posterior at one training data point. Each test point's code (taken posterior mean) has an NLL under this mixture density. FIGS. 5A to 5D show the histograms of NLLs of 1000 test samples' codes before and after manipulation. As shown, the discrepancy in NLL between the original and the manipulated codes becomes larger as the magnitude of the manipulation is increased, indicating that the manipulated codes may fall into the low density area.

FIGS. 5A to 5D illustrate, in graphs 500A, 500B, 500C, 500D, histograms of all the test samples' negative log-likelihood (NLL) under the aggregated posterior, considering their original latent codes and manipulated ones, in accordance with some embodiments. Graphs 500A, 500B and 500C show three manipulation strategies for β-VAE with aggressive training. Graph 500A shows a small magnitude of manipulation (±σ) with good overlap 530a between the original 510a and the variation 520a. As the magnitude of manipulation increases (i.e., transfer strength in graphs 500B and 500C), there is less overlap or latent space 530b, 530c (i.e., less content preservation) between the originals 510b, 510c and the variations 520b, 520c. Graph 500D shows results using CP-VAE described herein, in accordance with some embodiments. The method 400 can successfully transform a sentence to a desired sentiment or topic (i.e., high transfer strength) while keeping small overlap or latent space 530d (i.e., good content preservation) between the original 510d and the variation 520d.

Highest Density Region and Topological Analysis

The notion of vacant regions or holes is a topological concept, so it is natural to use tools from topological data analysis (TDA) to measure and visualize this phenomenon. Given the aggregated posterior $q_\phi(z)$, the highest density region (HDR) at level $(1-\varepsilon)$ is defined to be:
$D_\varepsilon = \{z | q_\phi(z) \geq c_\varepsilon\}$, where $c_\varepsilon$ is the largest constant such that $Pr(z \in D_\varepsilon) \geq 1-\varepsilon$. Intuitively, HDR captures the notion of "significant support", where the density is cut at $c_\varepsilon$ to form a subset $D_\varepsilon$ of the latent space that contains at least $1-\varepsilon$ of the probability mass. "Vacancy" in the aggregated posterior $q_\phi(z)$ means that the $(1-\varepsilon)$-HDR has holes or disconnected components. It should be emphasized that $\varepsilon$ is conceptual and used to formalize the definition; it is not a hyperparameter of any model. In practice, whenever a finite sample set is drawn, the points are in the HDR $D_\varepsilon$ with probability $1-\varepsilon$, for some strictly positive e.

The mapper algorithm may be used here to visualize the connectedness of $D_\varepsilon$'s[1] for β-VAE trained on images and text respectively. Further details can be found below. The input to the mapper algorithm is a point cloud. It is the posterior samples at training points under each model. The output of the mapper is a graph, like the ones shown in FIG. 6. Each node in the graph corresponds to a set of nearby points in the original point cloud. The connectivity of the graph reflects some topological properties of the sampling space of the point cloud. Such properties include connectedness and the presence of holes.

Figure 6:
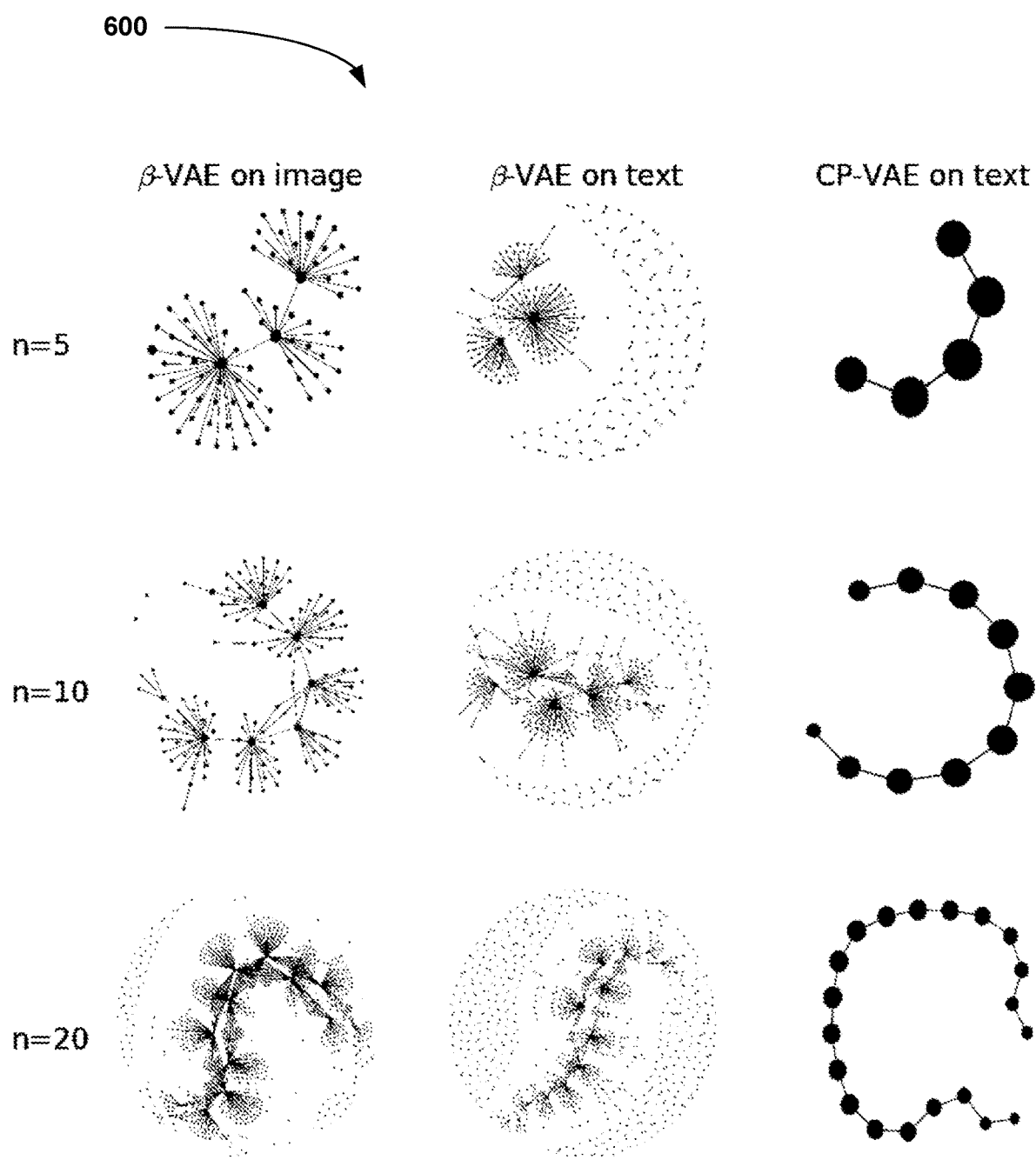
FIG. 6 illustrates a topological analysis of the highest density region (HDR) of aggregated posterior using the mapper algorithm, in accordance with some embodiments.

FIG. 6 illustrates a topological analysis 600 of the highest density region (HDR) of aggregated posterior using the mapper algorithm, in accordance with some embodiments. The connectedness of the graph holds the key topological information. The shape on the 2D plane is irrelevant. Different n's control the coarseness of visualization. If a structure persists at multiple resolutions, it is stable. If it appears and disappears for selected values or a small range of n, then it is likely to be "topological noise".

The main take-away, as shown in FIG. 6, is that the HDR of β-VAE on images is one connected component (up to topological noise on the finest scale); whereas, for text, there are many disconnected components across all scales of visualization. This observation suggests that the underlying $D_\varepsilon$ for β-VAE on text is disconnected, providing empirical evidence that the latent vacancy problem is more severe on text than on images. Further explanations about the relationship of connectedness of $D_\varepsilon$ and that of the mapper graphs will now be described.

To help interpret the visualization in FIG. 6, a brief description of the mapper algorithm is provided. The algorithm uses some user-specified options. The first one is a continuous function f (also called a "lens", filter or projection) that points z from a point cloud Z to R. The range of f, $I=f(Z)$, is then divided into n overlapping open intervals $\{I_j\}_{j=1}^n$. The pre-images of these intervals are then found, $U_j = f^{-1}(I_j)$, which are open sets in the input space. Points in each $U_j$ are then further partitioned using a clustering algorithm (e.g. DBSCAN). In the end, across all pre-images $U_j$'s, there is a collection of clusters $U_{jk}$, which might or might not intersect. Each cluster $U_{jk}$ may be represented as a graph node and connect two nodes if and only if the point sets intersect.

The continuous function may be taken to be the sum of values in each dimension of input, and n is varied to inspect if the discovered structure persists over multiple scales or is a noise.

In the resulting graph, disconnected nodes can arise in two ways. First, if the intersecting portion of some pair of overlapping intervals does not actually contain a point mapped from the input point cloud. But this is avoided by an open cover construction. The second case is if there are actually disconnected components in the input space. Without loss of generality, assume there are two. Then by construction, some points from the two sets will be mapped to the same interval $\tilde{I}$, or shared portion of two covering intervals in the range, $\tilde{I} = I_j \cap I_k$. The pre-image of $\tilde{I}$ is the only set that could lead to a connection of the nodes, however, since it contains points that are not in the same neighborhood, clustering of this pre-image will produce two disconnected nodes, forming a disconnected graph.

Constraining the Posterior

In order to resolve the latent vacancy problem, CP-VAE is proposed herein, where the posterior is constrained in such a way that the manipulation only happens in a learned simplex, so that most space in this constrained subspace can be covered during training. In this constrained subspace, the phenomenon of low density holes of aggregated posterior is significantly reduced, as FIG. 5D empirically show that there is little change in NLL of original versus manipulated codes. Furthermore, FIG. 6 shows that the HDR of CP-VAE is one connected component (the HDR visualized here is for $z^{(1)}$ introduced below). At the same time, CP-VAE can maintain its transfer strength to effectively transfer the source sentence to the desired style, as exemplified in Table 1. The details of the proposed method will now be presented.

CP-VAE Method

The experiments conducted above validate the existence of vacancy in the aggregated posterior latent space. One potential way to resolve the problem is to better match the aggregated posterior with the prior. However, in terms of unsupervised learning of controllable representation for text, these previous methods have not shown success; one only attempted supervised text style transfer, and also reported negative results from the AAE. Another way to resolve the vacancy issue is to directly enforce that the aggregated posterior itself has no vacant region anywhere where we would like to perform latent code manipulation. Mapping the posterior Gaussian mean to a constrained space is proposed, more specifically a learned probability simplex, where the constrained latent space can be encouraged to be filled without vacancy, and manipulation can be performed to be within this simplex. A mapping function is added as part of the encoding network which maps the mean of the Gaussian posterior to a constrained space. Two regularization terms are introduced to ensure the learned simplex is not degenerate and that this subspace is well filled.

In addition, the relevant factors to be controlled separated from the irrelevant factors can be modelled by splitting z into two parts $z^{(1)}$ and $z^{(2)}$. The first part captures the relevant factors that are dominant in the data without an inductive bias from external signals, while the second part learns to encode the remaining local information that is useful for reconstructing the source sentences. As a result, $q_\phi(z|x)$ is decomposed into $q_{\phi_1}(z^{(1)}|x)q_{\phi_2}(z^{(2)}|x)$ where $\phi=\phi_1 \cap \phi_2$. With diagonal covariances, the Kullback-Leibler (KL) divergence term in equation (1) splits into two separate KL terms. In practice, a multi-layer perceptron (MLP) encoding network is used to parametrize $z^{(1)}$ with some sentence representation as the input (e.g., averaging global vectors for word representation (GloVe) embeddings over the input tokens) and a LSTM) encoding network to parametrize $z^{(2)}$. The posterior of $z^{(1)}$ is constrained, and $z^{(2)}$ is optimized the same way as the traditional VAE.

Constraining the Posterior

The semantic variation will be discovered from the corpora, and will also be disentangled from the syntax variation of the corpora. As noted, the latent code is decomposed into two parts, $z^{(2)}$ is essentially the unstructured latent code in the vanilla VAE. How to discover and disentangle the underlying semantic variations by enforcing a structure constraint on the latent space of $z^{(1)} \in R^N$, i.e., how to map the mean $\mu$ of the Gaussian posterior for $z^{(1)} \in R^N$ to a constrained latent space, will now be described.

The latent code $z^{(1)}$ is forced to have low-rank structure in its latent space as follows:

$$z^{(1)} = \sum_{i=1}^{K} p_i e_i, \sum_{i=1}^{K} p_i = 1, \langle e_i, e_j \rangle = 0, i \neq j, \quad (2a)$$

where $e_i$ are vectors representing the semantic variations, $p_i$ is the proportion of this semantic variation encoded in in $z^{(1)}$, K is a hyperparameter indicating the number of semantic variations to discover. In other words, the latent space of $z^{(1)}$ is constrained to be a subspace of rank K in $R^N$ spanned by the orthogonal basis $e_i$, $i=1, \ldots, K$.

Initially, the raw latent code $z^{(1)}$ encoded by the encoder network is unstructured. The structure constraint may be enforced by reconstructing $z^{(1)}$ by $z^{(1)}=E \cdot p$, where $E=[e_1, \ldots, e_K]$ is a learnable embedding matrix representing the semantic basis, and $p=[p_1, \ldots, p_K]$ can be obtained by:

$$p=\text{softmax}(Wz^{(1)}+b) \quad (3a)$$

where W, the weight matrix, and b, the bias vector, are learnable parameters. Similar to an autoencoder, the reconstruction error of the semantic latent code may be minimized. For each input sentence, m sentences may be randomly sampled from the training data as negative samples. With the same encoding and reconstructing process, the latent code $u_i$ is obtained for each negative sample. A goal is to make the raw latent code $z^{(1)}$ similar to the restructured latent code $\tilde{z}^{(1)}$ while different from latent code $u_i$ of negative samples. Following , the semantic reconstruction loss may be formulated as a margin loss:

$$L_{S-REC}(x; \phi_1, \lambda) = \quad (4)$$
$$E_{z^{(1)} \sim q_{\phi_1}(z^{(1)}|x)} \left[ \frac{1}{m} \sum_{i=1}^{m} \max(0, 1 - \tilde{z}^{(1)} \cdot z^{(1)} + \tilde{z}^{(1)} \cdot u_i) \right],$$

where $\lambda=\{E, W, b\}$.

With the semantic reconstruction error as defined with Eq. 4a alone, the orthogonality of $e_i$ defined in Eq. 2a cannot be achieved. The semantic variation embedding basis E may collapse to lower rank, leading to incomplete disentanglement of the underlying semantic variations. To encourage the orthogonality of the semantic variation basis vectors, a regularization term is added to the objective function:

$$L_{REG}(x; \lambda) = \|E^T \cdot E - I\| \quad (5)$$

where I is the identity matrix. The final objective function may be defined as follows:

$$L(x; \theta, \phi, \lambda) = L_{VAE} + L_{S-REC} + L_{REG} \quad (6)$$

Expressed another way, the mean p is to be constrained to have a structure as follows:

$$\mu = \sum_{i=1}^{K} p_i e_i, \sum_{i=1}^{K} p_i, \langle e_i, e_j \rangle = 0, i \neq i, K \leq N \quad (2b)$$

where $e_i$ are vectors representing the relevant factors, $p_i$ is the proportion of ith relevant factor encoded in $z^{(1))}$ and K is a hyperparameter indicating the number of relevant factors to discover. In other words, the mean of the Gaussian posterior of $z^{(1)}$ is constrained to be inside a K-dimension probability simplex in $R^N$ whose vertices are represented by the orthogonal basis vectors $e_i$, $i=1, \ldots, K$. Given the outputs of the MLP encoder h and log $\sigma^2$, an additional mapping function $\pi$ is learned which maps h to the constrained posterior space, which can be treated as part of the encoding network:

$$\mu = \pi(h) = E \cdot \text{softmax}(Wh+b) \quad (3b)$$

where $E=[e_1, \ldots, e_K]$ is a learnable embedding matrix representing the bases, W is the learnable weight matrix, and b is the learnable bias vector. As a result, the constrained posterior is parametrized by $\mu$ and log $\sigma^2$ as a Gaussian distribution $N(\mu, \text{diag}(\sigma^2))$.

Preventing Semantic Posterior Collapse

Posterior collapse is a phenomenon where the model ignores the latent code z during the training of VAEs. It becomes worse when the generator $p_\theta(x|z)$ is parametrized with a strong autoregressive neural network which is often the case for text generation. Moreover, there may be an abundance of signals to predict the next token in the text but the signals indicating high-level semantics are quite sparse. VAEs may not be able to capture useful semantic information from raw text without collapse, and at the same time filter out irrelevant noisy signals.

Recent successes of large-scale pre-training on various tasks on language showcase the capabilities of these pre-trained models to capture high-level semantic information. In the hope that such pre-trained models can help capture semantic information, natural language processing (e.g., bidirectional encoder representations from transformers (BERT)) may be used as a sentence-level feature extractor $f(\cdot)$ to parametrize $z^{(1)}$ which is an isotropic Gaussian distribution:

$$\mu = W_\mu \cdot f(x) + b_\mu, \log \sigma^2 = W_\sigma \cdot f(x) + b_\sigma \quad (7)$$

where $W_\mu$, $b_\mu$, $W_\sigma$, $b_\sigma$ are all learnable parameters.

Prior works try to mitigate posterior collapse in various ways and can be applied to resolve the posterior collapse for $z^{(2)}$. For the semantic posterior collapse for $z^{(1)}$, existing methods may not be enough to fully resolve this problem. The structure constraint note above introduces a natural recipe to prevent semantic posterior collapse. For example, the KL divergence between $q_{\phi_2}(z^{(1)}|x)$ and $p(z^{(1)})$ is:

$$D_{KL}(q_{\phi_2}(z^{(1)}|x) \| p(z^{(1)})) = \frac{1}{2}\mu^2 + \frac{1}{2}(\sigma^2 - \log \sigma^2 - 1) \quad (8a)$$

If the structure constraint is applied on µ, with the orthogonality the first term in the above equation can be factorized into:

$$\mu^2 = \left(\sum_i p_i e_i\right)^2 = \sum_i p_i^2 e_i^2 \quad (9a)$$

With Eq. 5, we have $e_i^2=1$, so that $\mu^2=\Sigma_i p_i^2$ reaching its minimum $$\frac{1}{K^2}$$

when $$p_i = \frac{1}{K}, i = 1, \ldots, K.$$

Due to this term, we can see that the KL term will never collapse with the structure constraint. Another hyperparameter a can be added into Eq. 5 to further enhance the effect by making $e_i^2=\alpha$ and $\mu^2=\alpha\Sigma_i p_i^2$:

$$L_{REG}(x; \lambda)=\|E^T \cdot E - \alpha I\| \quad (10a)$$

With the mapping function alone, the proposed VAE suffers from posterior collapse, a well-known problem where the model ignores the latent code z during the training. Further complicating matters is the fact that there is an abundance of signals for predicting the next token in the text, but the signals indicating high-level semantics are quite sparse. It is thus unlikely that the VAEs can capture useful relevant factors from raw text without collapse. For these reasons, orthogonality is enforced in the learnt basis vectors as defined in equation 2, which introduces a natural recipe to prevent posterior collapse for $z^{(1)}$. Note that the KL divergence between $q_{\phi_1}(z^{(1)}|x)$ and $p(z^{(1)})$ is:

$$D_{KL}\left(q_{\phi_1(z^{(1)})}\left|x\right)\|pz^{(1)})\right) = \frac{1}{2}\mu^T\mu + \frac{1}{2}(\sigma^T\sigma - \log\sigma^T\sigma - 1). \quad (8b)$$

With orthogonality in the basis vectors, the first term in the above equation can be factorized into:

$$\mu^T\mu = \left(\sum_i p_i e_i\right)^T \left(\sum_i p_i e_i\right) = \sum_i p_i^2 e_i^T e_i. \quad (9b)$$

To encourage orthogonality in the basis vectors, a regularization term is added to the objective function:

$$L_{REG}(x; \phi_1)=\|E^T E - \alpha I\| \quad (10b)$$

where I is the identity matrix and $\alpha$ is a hyperparamter. When $L_{REG}=0$, $e_i^T e_i=\alpha$. In this case, $\mu^T\mu=\alpha\Sigma_i p_i^2$ reaches its minimum $$\frac{\alpha}{K}$$

when p is a uniform distribution. In practice, $L_{REG}$ will quickly decrease to around 0, ensuring that the KL term will never fully collapse with the structural constraint. When it comes to controlled generation, one can choose a vertex or any desired point in the probability simplex.

The following is a proof of minimalization of Eq. 9b. The problem can be formulated as follows:

$$\text{maximize } \sum_{i=1}^{K} p_i^2, \text{ subject to } \sum_{i=1}^{K} p_i = 1.$$

By introducing a Lagrange multiplier $\lambda$, the Lagrange function is defined as $$L(p_1, p_2, \ldots, p_K, \lambda) = \sum_{i=1}^{K} p_i^2 - \lambda\left(\sum_{i=1}^{K} p_i - 1\right).$$

In order to find the optimal point, we require that $$\frac{\partial}{\partial p_i}\left(\sum_{i=1}^{K} p_i^2 - \lambda\left(\sum_{i=1}^{K} p_i - 1\right)\right) = 2p_i - \lambda = 0, i = 1, 2, \ldots, K,$$

which shows that all $p_i$ are equal. By using the constraint $\Sigma_i p_i=1$, we find $$p_i = \frac{1}{K}, i = 1, 2, \ldots, K.$$

By plugging into the results, $\mu^T\mu=\alpha\Sigma_i p_i^2$ reaches its minimum $$\frac{\alpha}{K}.$$

Filling the Constrained Space

Constraining the posterior inside a certain space does not guarantee that this space will be filled after training. The probability distribution should also be encouraged over the relevant factors p to cover as much of the constrained latent space as possible. A reconstruction error of the structured latent code is introduced in order to push p away from a uniform distribution. For each input sentence, m sentences are randomly sampled from the training data as negative samples. By applying the same encoding process, the structured latent code $\mu_i^{(-)}$ is obtained for each negative sample. The goal is to make the raw latent code h similar to the restructured latent code µ while different from latent codes $\mu_i^{(-)}$ of the negative samples, so that p is generally different for each input sample. The structured reconstruction loss is formulated as a margin loss as follows:

$$L_{S-REC}(x; \varphi_1) = E_{z^{(1)} \sim q_{\varphi_1}}(z^{(1)})\left[\frac{1}{m}\sum_{i=1}^{m}\max\left(0, 1 - h\cdot\mu + h\cdot\mu_i^{(-)}\right)\right]. \quad (11)$$

The final objective function is defined as follows:

$$L(x; \theta, \varphi)=L_{VAE}+L_{REG}L_{S-REC} \quad (12)$$

Experiments and Sample Embodiments

To demonstrate the effectiveness of the SUS-VAE approach, an experiment on two tasks with different underlying semantic variations was performed: text style transfer whose dominating semantic variation is sentiments, topic modelling whose dominating semantic variation is topics. A single-layer LSTM for the decoder $p_\theta(x|z)$ and a single-layer bi-directional LSTM for encoder of $z^{(2)}$, $q_{\phi_2}(z^{(2)}|x)$ were used in the experiment. To avoid posterior collapse, KL annealing and β-VAE was used in different cases. For decoding, beam search was used with beam size as 5.

To demonstrate the effectiveness of CP-VAE, it was compared to unsupervised baselines with β-VAE and state-of-the-art optimizing techniques, considering the performance on unsupervised sentiment manipulation. Following evaluation protocols in text style transfer, the CP-VAE method was also compared to strong supervised approaches. Furthermore, the ability of finer-grained style discovery and transition possessed by the CP-VAE system will be showcased below.

Example detailed configurations including the hyperparameters, model architecture, training regimes, and decoding strategy will now be described.

Across all the datasets, Adam may be used with learning rate 0.001 to update the parameters for the encoding network, while SGD with learning rate 1.0 to update the parameters for the decoding network. The batch size is chosen to be 32. Dropouts with drop probability 0.5 are applied on applied on after the embedding layer and the LSTM layer in the decoding network. The model may be trained until the reconstruction loss stops decreasing.

For the structured part, $z^{(1)}$, β-VAE setting β as 0.2 may be used across all the datasets. For the unstructured part, $z^{(2)}$, different strategies are employed for each dataset:

Yelp: β-VAE setting β as 0.35.
Amazon: β-VAE setting β as 0.35.
AG-News: KL annealing, from 0.1 to 1.0 in 10 epochs.

Table 2 illustrates hyperparameter settings. The hyperparameters are chosen by hecking $L_{VAE}$, KL, and the generated outputs on the development set for Yelp and AG-News. K ∈ {3, 5, 10}, α ∈ {1, 10, 100}, input dimension for LSTM encoder ∈ {128, 256, 512}, hidden dimension for LSTM encoder ∈ {512, 1024, 2048}, dimension for z(2) ∈ {32, 64, 96}, dimension for z(1) ∈ {16, 32, 48}, input dimension for LSTM decoder ∈ {128, 256, 512} and hidden dimension for LSTM decoder ∈ {512, 1024, 2048} were chosen. Amazon follows the same setting as Yelp without extra tuning.

TABLE 2

Hyperparameter settings

|  | Yelp | Amazon | AG-News |
|---|---|---|---|
| Number of variations K | 3 | 3 | 10 |
| Parameter to control the KL α | 100 | 100 | 10 |
| Input dimension for LSTM encoder | 256 | 256 | 512 |
| Hidden dimension for LSTM encoder | 1024 | 1024 | 1024 |
| Dimension for $z^{(2)}$ | 64 | 64 | 96 |
| Dimension for $z^{(1)}$ | 16 | 16 | 32 |
| Input dimension for LSTM decoder | 128 | 128 | 512 |
| Hidden dimension for LSTM decoder | 1024 | 1024 | 1024 |

For decoding, beam search with a beam size of 5 may be used.

Comparisons with Unsupervised Baselines

Experimental setup: The same experimental setting and dataset as mentioned above is used. The 80D latent code is split into 16 and 64 dimensions for $z^{(1)}$ and $z^{(2)}$ respectively. The sentence representations for $z^{(1)}$ is the averaged GloVe embeddings over the input tokens and K is chosen as 3. To decide which basis vector corresponds to which sentiment, 10 positive and 10 negative sentences were sampled in the development set, passed to the encoder, and the basis vector was chosen with the highest average $p_i$ in p=softmax(Wh+b), yielding $v_p$ as the positive basis and $v_n$ as the negative basis. If $v_p$ and $v_n$ are chosen to be the same vector, the index with the second highest $p_i$ for $v_p$ is chosen. To perform sentiment manipulation, $z^{(1)}$ is fixed to be the chosen basis vector; that is, $v_p$ or $v_n$.

Comparisons with metrics on text style transfer: For quantitative evaluation, two general automatic evaluation metrics used in text style transfer are adopted: classification accuracy (AC) of a pre-trained classifier to measure the transfer strength; BLEU score (BL) of the transferred sentences against the source sentences to measure the content preservation. As shown in Table 3, β-VAE alone performs poorly in terms of content preservation no matter the modification magnitude, while aggressively training the encoder can notably help improve content preservation. However, no matter whether or not aggressive training is used, the content preservation deteriorates drastically as the modification magnitude is increased, in order to achieve reasonable transfer strength. With large enough modification magnitude, the classification accuracy can be pushed to almost perfect, while the BLEU score decreases towards zero, meaning that the transferred sentences become totally irrelevant to the source sentences. The results match the observations from the experiments on density under the aggregated posterior distribution, confirming that latent vacancy prevents effective manipulation of the latent codes. To the contrary, CP-VAE can achieve much better content preservation while maintain its transfer strength, indicating its effectiveness to mitigate the latent vacancy problem.

TABLE 3

Comparisons with unsupervised baselines on dataset.

| Model | Accuracy (AC) ↑ | BLEU (BL) ↑ |
|---|---|---|
| β-VAE (±σ) | 50.98 ± 2.89 | 4.02 ± 0.77 |
| β-VAE (±2 * σ) | 78.44 ± 4.84 | 1.49 ± 0.29 |
| β-VAE (extremum) | 98.18 ± 1.56 | 0.56 ± 0.40 |
| β-VAE w. aggr training (±σ) | 26.76 ± 6.44 | 27.91 ± 4.39 |
| β-VAE w. aggr training (±2 * σ) | 57.46 ± 14.47 | 11.73 ± 6.74 |
| β-VAE w. aggr training (extremum) | 88.08 ± 14.95 | 4.57 ± 4.63 |
| CP-VAE w. GloVe without | 60.22 ± 4.57 | 33.69 ± 1.47 |
| $L_{REG}$ without $L_{S-REC}$ | 10.82 ± 0.91 | 33.27 ± 2.84 |
|  | 12.28 ± 3.69 | 49.34 ± 2.65 |

Figure 7:
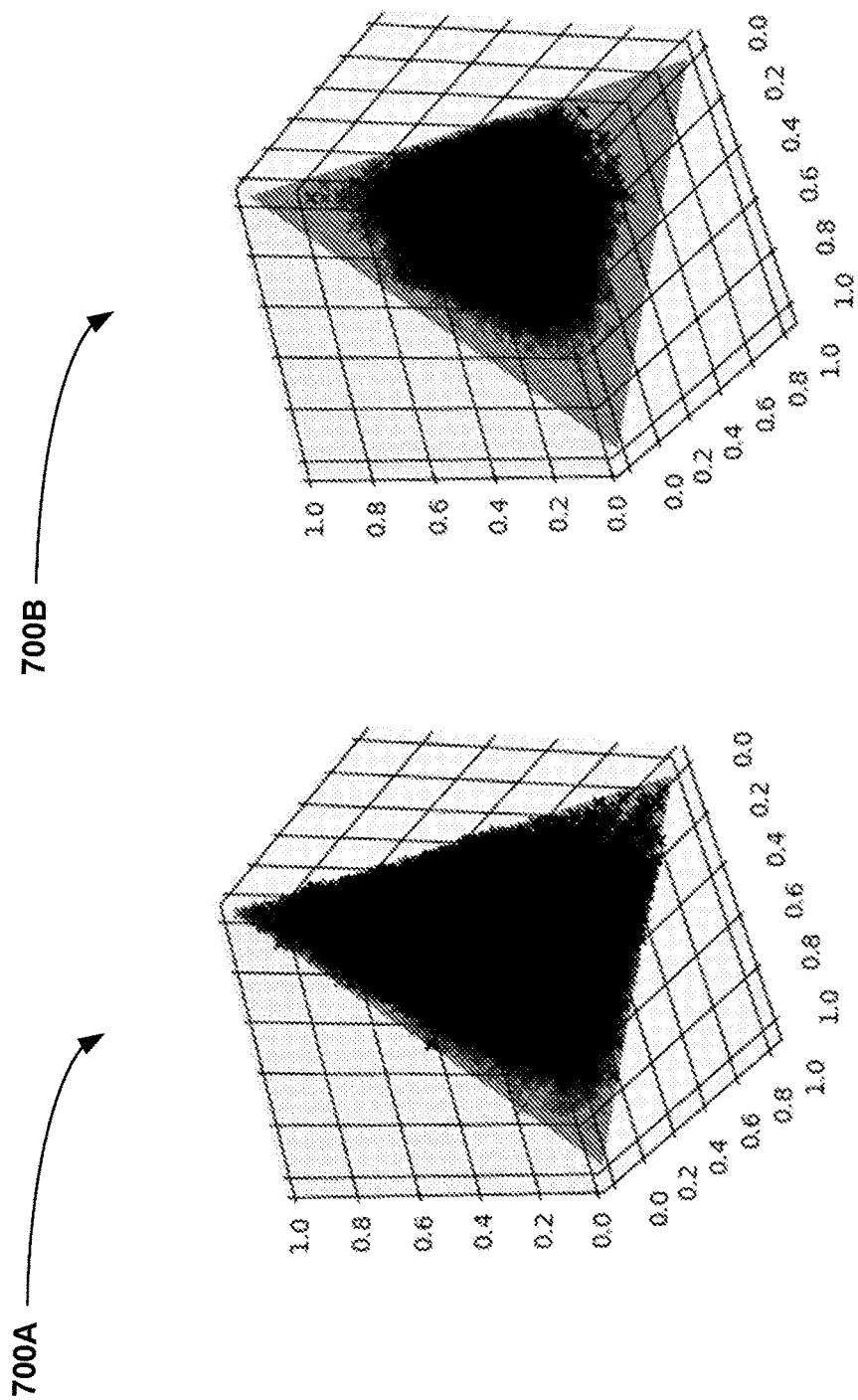
FIGS. 7A and 7B illustrate visualization of all training samples in the probability simplex, in accordance with some embodiments.

An ablation study was also conducted by removing $L_{REG}$ and $L_{S-REC}$ from the objective. The results demonstrate that both terms are valuable to CP-VAE. Since K is chosen as 3, it is convenient to visualize the samples during training with p in the learnt probability simplex, as shown in FIGS. 7A and 7B. As shown, the whole simplex is mostly covered with samples with the help of $L_{S-REC}$. FIGS. 7A and 7B illustrate visualization of all training samples in the probability simplex, in accordance with some embodiments. FIG. 7A shows the results where the final objective function includes $L_{S-REC}$, and FIG. 7B shows the results where the final objective function does not include $L_{S-REC}$.

Text Style Transfer

Experimental setup: Yelp restaurant reviews were used as a dataset and the same data split. However, the sentiment labels were not used at all which is different from previous supervised methods. To decide which semantic variation basis corresponds to which sentiment (positive or negative), a sentence was fed with strong sentiment (e.g., "awesome!" for positive; "terrible!" for negative) to the encoder, and the semantic variation basis with the highest $p_i$ was chosen according to Eq. 3a, yielding $e_{pos}$ and $e_{neg}$. If $e_{pos}$ and $e_{neg}$ collide, the index with the second highest $p_i$ for $e_{pos}$ was chosen. To perform style transfer, $z^{(1)}$ was fixed as the chosen basis, that is, $e_{pos}$ or $e_{neg}$. For evaluation, previous approaches to measure whether transferred sentences have the correct sentiment according to a pre-trained CNN-based sentiment classifier were used. In addition, the BLEU score of the transferred sentences was measured against their original sentences, since it is desired for the transferred sentence to preserve the original content as much as possible, except the sentiment.

Quantitative results: Two strong supervised models were chosen as baselines: Cross-Aligned Autoencoder and Adversarial Regularized Autoencoder. Table 4 shows the CP-VAE approach outperforms these supervised baselines on both metrics by a noticeable margin, demonstrating that the CP-VAE approach not only can discover the underlying semantic variations, but also help to better disentangle them than previous approaches.

TABLE 4

Results for sentiment transfer.

| Model | Acc(%) | BLEU |
|---|---|---|
| Cross-Aligned AE | 83.63 | 23.68 |
| Adversarial Regularized AE | 83.49 | 25.64 |
| CP-VAE ($\alpha = 1$) | 33.12 | 89.54 |
| CP-VAE ($\alpha = 10$) | 93.78 | 31.62 |

Ablation Study: In order to take a deeper look into the CP-VAE approach, an ablation study was conducted by removing $L_{S-REC}$, $L_{REG}$ or replace $f(\cdot)$ with a LSTM encoder. $D_{KL}(q_{\phi_1}(z^{(1)}|x)\|p(z))$ (KL) and mutual information $I_q = D_{KL}q_{\phi_1}(z^{(1)}|x)\|p(z))$ $D_{KL}(q_{\phi_1}(z^{(1)})\|p(z))$ (MI) were reported to check the behaviours of the CP-VAE approach in each case. As shown in Table 5, all three components are were used in the CP-VAE approach. Without $L_{S-REC}$, the accuracy drops by a large portion while the BLEU score raises which means that the model gives higher priority to preserve the original content instead of performing style transfer which is undesirable. Without $L_{REG}$, both KL and MI go close to 0 indicating the posterior collapse for $z^{(1)}$. As a result, the model losses its whole ability to transfer sentences and fails with respect to accuracy. If $f(\cdot)$ is replaced with a LSTM encoder, KL does not collapse for $z^{(1)}$. However, the model seems unable to acquire the ability to perform style transfer by raw text alone without the help of $f(\cdot)$. In addition, we vary the value of and find that large e can force the model to give more attention to $z^{(1)}$ and help prevent the posterior collapse of $z^{(1)}$, leading to better performance on style transfer.

TABLE 5

Ablation study.

| Model | Acc(%) | BLEU | KL | MI |
|---|---|---|---|---|
| CP-VAE w/o $L_{S-REC}$ | 81.93 | 37.03 | 2.96 | 0.93 |
| CP-VAE w/o $L_{REG}$ | 15.03 | 35.73 | 0.36 | 0.11 |
| CP-VAE w/o $f(\cdot)$ | 16.52 | 23.68 | 5.64 | 0.84 |
| CP-VAE ($\alpha = 1$) | 89.54 | 33.12 | 3.56 | 1.09 |
| CP-VAE ($\alpha = 10$) | 93.78 | 31.62 | 4.44 | 1.41 |

Automatic discovery of finer grained sentiment: After looking into the generated outputs from the CP-VAE model, another basis which can generate outputs with neutral sentiment is found from time to time. In Table 6, two set of samples are shown with three sentiment basis fixed for $z^{(1)}$ and $z^{(2)}$ sampled from the prior $p(z^{(2)})$. The CP-VAE model can generate neutral reviews naturally with the discovered neutral sentiment which is beyond the capabilities of all the existing methods for text transfer. Since there is no explicit data labelled with such sentiment and the CP-VAE approach is data-dependent, there were sentences with neutral sentiment in the training data and the CP-VAE approach is able to effectively discover and disentangle these hidden variations without supervision.

TABLE 6

Samples chosen from the decoding for the three semantic variation basis discovered.

| Sentiment | Samples |
|---|---|
| Positive | this is my favorite spot. |
| Negative | this is unacceptable for lunch. |
| Neutral | this is _num_ bucks. |
| Positive | the place makes us feel welcomed. |
| Negative | the place gets worse than new ownership. |
| Neutral | the place gets _num_ miles away. |

Comparisons to Supervised Approaches on Text Style Transfer

Experimental setup: Two datasets were chosen on text style transfer which provide human gold standard references for the test set. The same train-dev-test splits are used in the experiments. Two different sentence representations are used in this experiment, averaged GloVe and BERT, denoted as CP-G(loVe) and CP-B(ert) respectively. The remaining settings are as described above.

Compared supervised approaches: On the two datasets, three adversarially trained models were compared: StyleEmbedding (SE), MultiDecoder (MD), CrossAligned (CA) and two state-of-the-art models based on a "delete, transform, and generate" framework: DeleteAndRetrieve (D&R) and Blind-GenerativeStyleTransformer (BGST). To be noted, the decoding network of B-GST is based on GPT-2, while all the other models including the CP model described herein train the decoding network from scratch.

Evaluation protocols: Four different automatic evaluation metrics are used to measure the different perspectives of the transferring quality. To measure transfer strength, pre-trained CNN based classifiers were used achieving 98% and 84% accuracies on the test sets respectively. To measure content preservation, the BLEU score of the transferred sentences was used against the source sentences. To measure fluency, OpenAI GPT-2 was fine-tuned with 345 million parameters on the same training-dev-test split to obtain the perplexity of generated sentences. The fine-tuned language models achieve perplexities of 26.6 and 34.5 on the test sets respectively. In addition, it has been argued in the literature that the Generalized Language Evaluation Understanding Metric (GLEU) has a better correlation with the human judgement. Here, we use the implementation of GLEU3 to calculate the GLEU score.

Result Analysis: As observed in the literature, accuracy, BLEU score and perplexity do not correlate well with human evaluations. Therefore, it is important to not consider them in isolation. Table 7 shows that the proposed approaches get similar scores on these metrics with human reference sentences on the second row, indicating that the generated sentences of the proposed approaches is reasonable considering the combination of these metrics. As verified above, GLEU strike a balance between target style match and content retention and correlate well with the human evaluations. From Table 7, CP-VAE consistently outperforms the three adversarially trained models and D&R on GLEU by a noticeable margin. As compared to B-GST, the current state-of-the-art, which leverages GPT-2 for generation, the results are still competitive, despite the fact that CP-VAE is trained unsupervisedly and from scratch. By checking the samples generated from the models as shown in Table 8, B-GST is more consistent to the source sentence, which can be expected, since it only makes necessary edits to flip the sentiment. CP-VAE tends to generate more diverse contents which may not be relevant sometimes, but the overall quality is reasonable.

TABLE 7

Comparisons with supervised approaches on two datasets.

| Model | Supervised | GPT-2 | Dataset 1 | | | | Dataset 2 | | | |
|---|---|---|---|---|---|---|---|---|---|---|
| | | | AC ↑ | BL ↑ | GL ↑ | PL ↓ | AC ↑ | BL ↑ | GL ↑ | PL ↓ |
| Source | — | — | 1.8 | 100.0 | 8.4 | 26.6 | 16.3 | 100.0 | 22.8 | 34.5 |
| Human | — | — | 70.1 | 25.3 | 100.0 | 63.7 | 41.2 | 45.7 | 100.0 | 68.6 |
| CA | ✓ | X | 74.0 | 20.7 | 6.0 | 103.6 | 75.5 | 0.0 | 0.0 | 39.3 |
| SE | ✓ | X | 8.2 | 67.4 | 6.9 | 65.4 | 40.2 | 0.4 | 0.0 | 125.0 |
| MD | ✓ | X | 49.5 | 40.1 | 6.6 | 164.1 | 70.1 | 0.3 | 0.0 | 138.8 |
| D&R | ✓ | X | 88.1 | 36.7 | 7.9 | 85.5 | 49.2 | 0.6 | 0.0 | 46.3 |
| CP-G | X | X | 66.7 | 35.5 | 7.5 | 67.8 | 60.1 | 35.4 | 11.5 | 109.1 |
| CP-B | X | X | 55.4 | 48.4 | 9.6 | 47.6 | 40.0 | 39.7 | 12.7 | 97.3 |
| B-GST | ✓ | ✓ | 85.6 | 45.2 | 12.7 | 49.6 | 55.2 | 52.3 | 18.1 | 48.2 |

TABLE 8

Samples of generated sentences.

| Dataset 1 | Positive to Negative | Negative to Positive |
|---|---|---|
| SRC | this place is super yummy! | but it probably sucks too! |
| B-GST | this place is super bad! | but it tastes great too! |
| CP-G | this place is super slow and watered down. | but it's truly fun and insanely delicious. |
| CP-B | this place is super greasy and gross! | but it's probably wonderful when you! |

| Dataset 2 | Positive to Negative | Negative to Positive |
|---|---|---|
| SRC | because it s made of cast iron, scorching is minimized. | they are cheerios, afterall, and we love the original kind. |
| B-GST | because it s cheaply made of cast iron, is useless. | they are sturdy, afterall, sturdy and we love the original. |
| CP-G | because it s made of cast iron, vomitting. | they are ripe, tastier, and we love them. |
| CP-B | because it s made of cast iron, limp. | they are divine, fluffier, and we love them. |

SRC is the input sentence.

Additional samples are now provided. Table 9 shows sentiment manipulation results from positive to negative for the Yelp dataset:

TABLE 9

Sentiment manipulation results from positive to negative

| SRC | this was the best i have ever had! |
|---|---|
| B-GST | this was the worst place i have ever had! |
| CP-G | this was the worst pizza i have ever had! |
| CP-B | this was the worst i have ever had! |
| SRC | friendly and welcoming with a fun atmosphere and terrific food. |
| B-GST | the hummus is ridiculously bland and bland. |
| CP-G | rude and unorganized with a terrible atmosphere and coffee. |
| CP-B | the hummus is ridiculously greasy and tasteless. |
| SRC | i ordered the carne asada steak and it was cooked perfectly! |
| B-GST | i ordered the carne asada steak and it was just as bad! |
| CP-G | i ordered the carne asada steak and it was n't cooked and it was lacking. |
| CP-B | i ordered the carne asada burrito and it was mediocre. |
| SRC | the owner is a hoot and the facility is very accommodating. |
| B-GST | the owner is a jerk and the facility is very outdated. |
| CP-G | the owner is a hoot and the facility is empty and the layout is empty. |
| CP-B | the owner is a riot and the facility is very clean. |
| SRC | i will be going back and enjoying this great place! |
| B-GST | i won't be going pack and this place is horrible! |
| CP-G | i will be going back and eat this pizza hut elsewhere. |
| CP-B | i will be going back and hated the worst dining experience. |

Table 10 shows sentiment manipulation results from negative to positive for the Yelp dataset:

TABLE 10

Sentiment manipulation results from negative to positive

| SRC | there is definitely not enough room in that part of the venue. |
|---|---|
| B-GST | there is plenty enough seating in that part of the venue. |
| CP-G | there is definitely an authentic dinner in that part. |
| CP-B | there is definitely a nice theatre in that part. |
| SRC | but it probably sucks too! |
| B-GST | but it tastes great too! |
| CP-G | but it's truly fun and insanely delicious. |
| CP-B | but it's probably wonderful when u! |
| SRC | always rude in their tone and always have shitty customer service! |
| B-GST | always in tune with their tone and have great customer service. |
| CP-G | always great with their birthdays and always excellent music. |
| CP-B | always accommodating and my dog is always on family. |
| SRC | i was very sick the night after. |
| B-GST | i was very happy the night after. |
| CP-G | i was very pleased with the night. |
| CP-B | i was very happy with the night. |
| SRC | this is a horrible venue. |
| B-GST | this is a wonderful venue. |
| CP-G | this is a great place for celebrating friends. |
| CP-B | this is a great place for beginners. |

Table 11 shows sentiment manipulation results from positive to negative for the Amazon dataset:

TABLE 11

Sentiment manipulation results from positive to negative

| | |
|---|---|
| SRC | most pizza wheels that i ve seen are much smaller. |
| B-GST | most pizza dough that i ve seen are much better. |
| CP-G | most pizza wheels that i ve seen are much more good and are much quality. |
| CP-B | most pizza wheels that i ve seen are much better than are much better |
| SRC | however, this is an example of how rosle got it right. |
| B-GST | however, this game is an example of how rosle loves it. |
| CP-G | however, this is an example of how toxic . . . sad . . . obviously. |
| CP-B | however, this is an example of how cheap. similar. cheap advice. cheap advice. similar. |
| SRC | auto shut off after num num hours, which is a good feature. |
| B-GST | auto shuts off after num num hours, which is a shame. |
| CP-G | whipped mask off after num num hours, which is slimy which is disgusting. |
| CP-B | auto shut off after num num hours, which is a stupid idea, which seems to be bad. |
| SRC | that said, the mic did pic up everything it could. |
| B-GST | that said, the game took up eyerything it could. |
| CP-G | that said, the shampoo did nt smell him well. stopped cleaning everything. ended up smelling sick |
| CP-B | that said, the mic did not fit eyerything on well, let me down it weren t cleaning |
| SRC | i also prefered tha blade weight and thickness of the wustof! |
| B-GST | i also like the blade weight and of the wustof. |
| CP-G | i also disliked the blade weight and thickness of the materials. |
| CP-B | i also slammed the blade weight and thickness of the wide. |

Table 12 shows sentiment manipulation results from negative to positive for the Amazon dataset:

TABLE 12

Sentiment manipulation results from negative to positive

| | |
|---|---|
| SRC | the quality is declined quickly by heat exposure. |
| B-GST | the water is quickly drained by head exposure. |
| CP-G | the quality is utilitarian so grinding or sandwiches. |
| CP-B | the quality is priceless quickly by heat rises. |
| SRC | the directions were easy to follow but the quality of the easel was pathetic. |
| B-GST | the directions were easy to follow but the quality of the product was excellent. |
| CP-G | the directions were easy to follow but the quality is good for the quality and is |
| CP-B | the directions were easy to follow but the quality is what the quality is like the best quality of |
| SRC | multiplayer is just as bad, though thankfully not worse. |
| B-GST | quality is just as good, though thankfully not perfect. |
| CP-G | besides it is just good, though. those . . . usually . . . usually . . . |
| CP-B | multiplayer is just as bad, though somebody s also so far not so far but no problem. |
| SRC | another energy product that simply wastes our money. |
| B-GST | another energy product that simply saves our money. |
| CP-G | another energy product that simply glides your pasta. |
| CP-B | another energy product that simply wastes this money. |
| SRC | i received the wrong color and it shreds easily. |
| B-GST | i received the color and it works easily. |
| CP-G | i low the new color and it closes easily. |
| CP-B | i received the wrong color and it pours easily from dishwasher and dries easily on garlic easily. |

Finer-grained Style Discovery and Transition

To further explore the potential of CP-VAE, additional exploratory experiments were conducted. The AG news dataset was used, which contains four topic categories which are World, Sports, Business and Sci/Tech, with the title and description fields. Here, the title was dropped and the description field was used to train CP-VAE. K was set to K=10. All four topics are automatically discovered by CP-VAE and identified as described above. The results of the identified topics were also compared to standard baselines for unsupervised topic modelling.

Experimental setup: AG news dataset was used for this task. It contained 4 different topic categories: World, Sports, Business and Sci/Tech, with the title and description fields. For each category, there were 30,000 training examples and 1900 testing examples. For ease of presentation, the title is not presented and the description field was used. The CP-VAE approach was compared to two standard baselines for unsupervised topic modelling: (1) LDA, where a standard implementation of LDA is used for this baseline; and (2) k-means. To demonstrate the power of the CP-VAE approach beyond the pre-trained sentence representations (e.g., feature extractor f(·)), k-means clustering was performed directly on the sentence representations (e.g., sentence embedding obtained from f(·)). The inferred topics were mapped to one of the gold-standard topics manually with the optimal mapping and report the precision (a.k.a. purity), recall (a.k.a. collocation) and F1 score. The number of topics was chosen to be 10. The results reported for the baselines and the CP-VAE model are the average over 10 runs.

Topic identification quantitative results: The evaluation criterion is to assess how well the inferred topics match the true topics, measured by precision, recall and F1 scores. For the CP-VAE model, an inferred topic basis was first assigned to each news article, according to the highest pi obtained by Eq. 3a. Then, the mapping between inferred topics and gold-standard topics was used to assign the gold-standard label to each news article. The results are shown in Table 13. As shown, the CP-VAE approach can achieve comparable results with LDA while outperforming k-means in all four categories. This indicates that the CP-VAE approach can go beyond just clustering on pre-trained feature representations.

TABLE 13

Results for topic identification

| Topic | Model | Precision | Recall | $F_1$ |
|---|---|---|---|---|
| World | LDA | 69.73 | 75.32 | 72.14 |
|  | k-means | 67.64 | 47.63 | 55.90 |
|  | CP-VAE | 80.83 | 70.55 | 74.59 |
| Sports | LDA | 79.17 | 82.50 | 80.22 |
|  | k-means | 47.66 | 89.50 | 62.04 |
|  | CP-VAE | 81.14 | 78.88 | 79.49 |
| Business | LDA | 72.10 | 66.45 | 68.46 |
|  | k-means | 53.06 | 53.16 | 53.11 |
|  | CP-VAE | 64.04 | 64.53 | 63.97 |
| Sci/Tech | LDA | 66.55 | 59.77 | 61.60 |
|  | k-means | 81.32 | 31.59 | 44.67 |
|  | CP-VAE | 65.20 | 71.74 | 66.77 |

Generation with topic transition: To further explore the potentials of the CP-VAE model, the following exploratory experiments were conducted. First a topic basis discovered by the CP-VAE model was chosen and a few tokens were generated. Then, the topic basis was switched and the generation was continued until the end-of-sequence token was generated. Some of the samples generated are shown in Table 14. Three pairs of samples generated without and with topic transition are shown. The first sentence in the pair is generated with a topic basis fixed throughout the generation; while the second sentence is generated with topic transition. The generated outputs after switching are marked as bold.

TABLE 14

Three pairs of samples generated without and with topic transition

| World throughout | A federal judge on Friday ordered a federal appeals court to overturn a federal appeals court ruling that the Visa and MasterCard credit card associations violated federal antitrust law by barring the names of the state. |
| World to Sci/Tech | A federal judge on Friday ordered a federal appeals court to overturn a decision by the Supreme Court to overturn a decision by the Federal Communications Commission to block the company's antitrust case against Microsoft Corp. |

TABLE 14-continued

Three pairs of samples generated without and with topic transition

| Sports throughout | NEW YORK(Reuters) - Roger Federer, the world's No. 1 player, will miss the rest of the season because of a sore quadriceps. |
| Sports to Business | NEW YORK(Reuters) - Roger Federer, the world's No. 1 player, will miss the rest of the year because of a bid-rigging scandal. |
| Sci/Tech throughout | NewsFactor - IBM(NYSE: IBM) has unveiled the latest version of its Windows XP operating system, which is designed to make it easier for administrators to create and deploy honeypots. |
| Sci/Tech to Sports | NewsFactor - IBM(NYSE: IBM) has unveiled the latest version of its Windows XP operating system, which is designed to make it easier for the Olympics. |

As shown, the CP-VAE model acquire the ability to transition the sentence from one topic to another in a natural and fluent manner, i.e., the CP model learns to transition from one topic to another in a natural and fluent way within the same sentence. Several observations can be made based on these samples: (1) the CP-VAE model is good at detecting the name entities and replacing them with the name entities related to the chosen topic, showcasing its potential to do zero-shot name entity recognition; (2) the CP-VAE model is able to preserve the general syntactic structure of the original sentence, demonstrating that useful syntactic information has been learnt by the unstructured latent code $z^{(2)}$; (3) there is no hard restriction regarding when to switch the topic, the model will determine an appropriate way to do the transition by itself. Such observations confirm that CP-VAE possesses a filled constrained latent space which make the latent code robust to manipulation across different time steps, which can be effectively reflected in the generation process. In Table 15, a typical failure case is shown for topic transition which is no transition at all. This indicates that the example CP-VAE model used will perform the transition when the transition can be conducted in a natural way to avoid awkwardness. It should be understood that the CP-VAE model may be modified.

TABLE 15

One failure case for topic transition

| Sci/Tech throughout | Reuters - Microsoft Corp. on Monday said it will offer a new version of its desktop search tool for mobile devices. |
| Sci/Tech to Sports | Reuters - Microsoft Corp. on Monday said it will offer a new version of its desktop search tool for mobile phones. |

An additional sample is now shown. Table 16 shows topic transition examples on AG news:

TABLE 16

Topic transition examples

| World throughout | BAGHDAD (Reuters) - Iraq's interim prime minister, Iyad Allawi, said on Monday that the United States had no intention of withdrawing from the country to end the violence in Iraq. |
| World to Sports | BAGHDAD (Reuters) - Iraq's interim prime minister, Iyad Allawi, said on Monday that the United States had no intention of withdrawing its troops from the country to the end of the year. |
| World to Business | BAGHDAD (Reuters) - Iraq's interim prime minister, Iyad Allawi, said on Monday that the United States had no intention of withdrawing its troops from the country to the country, |
| World to Sci/Tech | BAGHDAD (Reuters) - Iraq's interim prime minister, Iyad Allawi, said on Monday that the United States had no intention of withdrawing its uranium enrichment program to the United States. |
| Sports throughout | For the first time in four years, the U.S. men's basketball team won the gold medal in the men's 400-meter medley relay. |

TABLE 16-continued

Topic transition examples

| | |
|---|---|
| Sports to World | For the first time in four years, the U.S. men's basketball team won the gold medal at the Athens Olympics in Athens, where the United States and the United States have agreed to a peace deal. |
| Sports to Business | For the first time in four years, the U.S. men's basketball team won the gold medal at the Athens Olympics on Wednesday, with a surge in crude oil prices. |
| Sports to .Sci/Tech | For the first time in four years, the U.S. men's basketball team won the gold medal in the men's Olympic basketball tournament in Beijing on Tuesday. |
| Business throughout | NEW YORK (Reuters) - U.S. stocks opened higher on Friday, as oil prices climbed above $48 a barrel and the Federal Reserve raised interest rates by a quarter percentage point. |
| Business to World | NEW YORK (Reuters) - U.S. stocks opened higher on Friday, as oil prices climbed above $48 a barrel and the Federal Reserve raised interest rates by a quarter percentage point. |
| Business to Sports | NEW YORK (Reuters) - U.S. stocks opened higher on Friday, as oil prices climbed above $48 a barrel and the Federal Reserve raised interest rates by a quarter percentage point. |
| Business to Sci/Tech | NEW YORK (Reuters) - U.S. stocks opened nigher on Friday, as oil prices climbed above $48 a barrel and the Federal Communications Commission said it would allow the companies to use mobile phones. |
| Sci/Tech throughout | SINGAPORE (Reuters) - South Korea's Hynix Semiconductor Inc. said on Tuesday it had developed a prototype micro fuel cell recharger for a range of security vulnerabilities in India. |
| Sci/Tech to World | SINGAPORE (Reuters) - South Korea's Hynix Semiconductor Inc. said on Tuesday it had developed a prototype micro fuel cell aimed at ending a standoff with North Korea. |
| Sci/Tech to Sports | SINGAPORE (Reuters) - South Korea's Hynix Semiconductor Inc. said on Tuesday it had developed a prototype micro fuel cell aimed at protecting the world's biggest gold medal. |
| Sci/Tech to Business | SINGAPORE (Reuters) - South Korea's Hynix Semiconductor Inc. said on Tuesday it had developed a prototype micro fuel cell aimed at protecting the world's largest oil producer. |

Unsupervised Learning of Disentangled Representations

Learning disentangled representations is an important step towards better representation learning which can be useful for (semi-)supervised learning of down-stream tasks, transfer and few-shot learning. VAEs have achieved promising results for unsupervised learning of disentangled representations. Several variations of VAEs have been proposed for better disentanglement. However, progress in this direction has been restricted to the image domain, and does not demonstrate successful controlled generation on text.

Controlled Text Generation

In order to perform controllable text generation, previous methods either assume annotated attributes or multiple text datasets with different known styles. The requirement of labelled data largely restricts the capabilities and the applications of these models. Instead, all the proposed framework described herein needs is raw text without any annotated attribute.

In the above teachings, latent vacancy was investigated as an important problem in unsupervised learning of controllable representations when modelling text with VAEs. To mitigate this, the solution proposed to constrain the posterior within a learned probability simplex and encourage this space to be filled, achieving the first success towards controlled text generation without supervision.

In some embodiments, the machine text generation system and method described above may be used to control sentiment in chat bots.

In some embodiments, the above teachings allow for classifications of sentences with little labelled data. For example, training a model in an unsupervised way with unlabelled data is now possible once the unlabelled data is disentangled from any labelled data. A supervised learning approach would be costly as each sentence would have to be manually labelled by a human operator. In the above, only the categories are manually labelled in some embodiments.

In some embodiments, the generation of text may be controlled by changing a sentiment setting. In some embodiments, a sentence may be paraphrased. In some embodiments, based on sentences used in training the model, news, reports, etc. may be auto-generated using the training data. A style, sentiment, etc. may be mimicked in the news, reports, etc.

Figure 8:
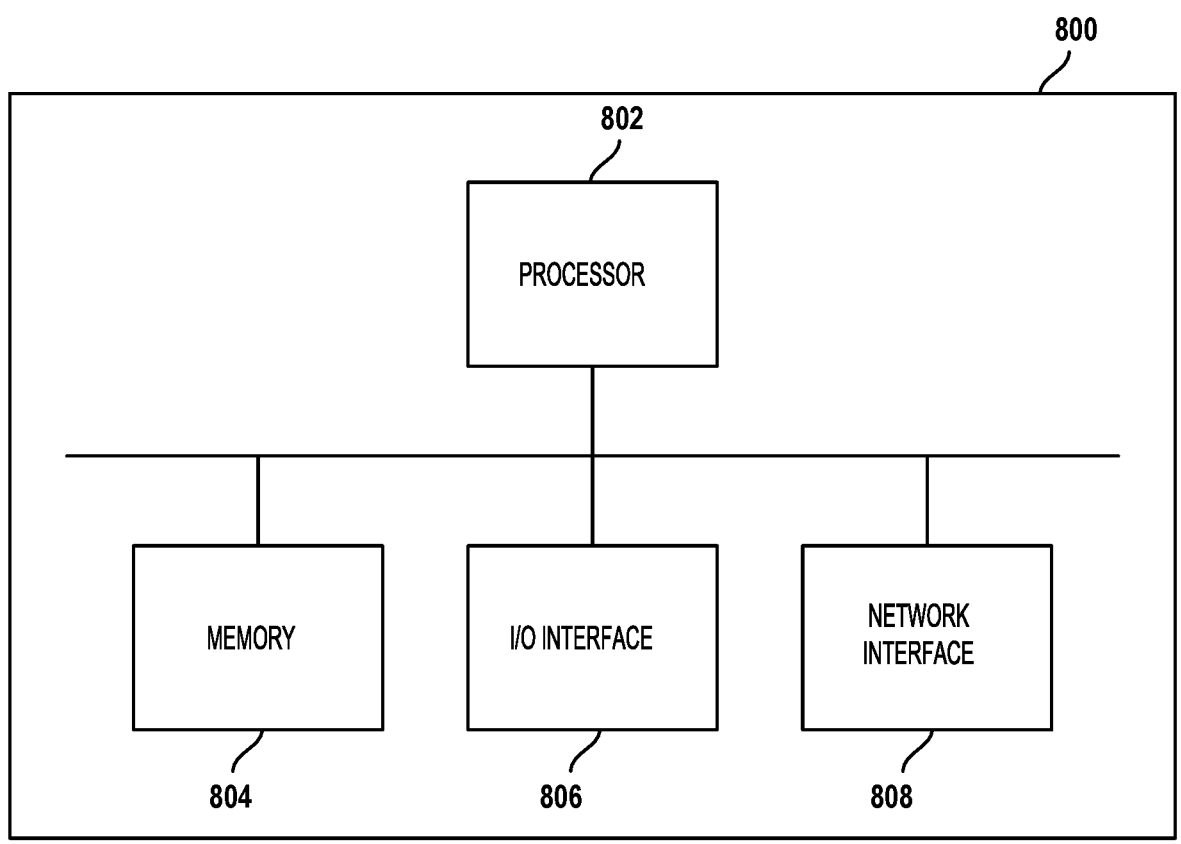
FIG. 8 is a schematic diagram of a computing device such as a server.

FIG. 8 is a schematic diagram of a computing device 800 such as a server. As depicted, the computing device includes at least one processor 802, memory 804, at least one I/O interface 806, and at least one network interface 808.

Processor 802 may be an Intel or AMD x86 or x64, PowerPC, ARM processor, or the like. Memory 804 may include a suitable combination of computer memory that is located either internally or externally such as, for example, random-access memory (RAM), read-only memory (ROM), compact disc read-only memory (CDROM).

Each I/O interface 806 enables computing device 800 to interconnect with one or more input devices, such as a keyboard, mouse, camera, touch screen and a microphone, or with one or more output devices such as a display screen and a speaker.

Each network interface 808 enables computing device 800 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g.

WMAX), SS7 signaling network, fixed line, local area network, wide area network, and others.

Additional Information

All the codes in this paper are implemented with PyTorch. For the implementation of β-VAE and pre-processing step in this paper, the codebase at https://github.com/jxhe/vae-lagging-encoder was followed. Some datasets used herein can be found at: https://github.com/agaralabs/transformer-drg-style-transfer.

For the β-VAE trained on OMNIGLOT, the same setting following the codebase of: https://github.com/jxhe/vae-lagging-encoder was used.

For the mapper algorithm, DBSCAN was used as the clustering algorithm. For DBSCAN, the following settings were made: E=0.1 and min samples=3. 100,000 points were sampled from the training set as the input. For the three cases visualized, the latent dimensions were all 16. The first 16 dimensions were chosen for β-VAE trained on text and images. For CP-VAE, $z^{(1)}$ was used.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for machine text generation, the system comprising:
    at least one processor; and
    a memory comprising instructions which, when executed by the processor, configure the processor to:
        process an original sentence structure through an encoder neural network to decompose the original sentence structure into an original semantics component and an original syntax component;
        process the original syntax component through a syntax variational autoencoder (VAE) to receive a syntax mean vector and a syntax covariance matrix;
        obtain a sampled syntax value from a syntax Gaussian posterior parameterized by the syntax mean vector and the syntax covariance matrix;
        process the original semantics component through a semantics VAE to receive a semantics mean vector and a semantics covariance matrix, the semantics mean vector constrained to be on or inside a simplex associated with a semantics Gaussian posterior and learned during training of a sentence model;
        obtain a sampled semantics vector from the Gaussian semantics posterior parameterized by the semantics mean vector and the semantics covariance matrix; and
        process the sampled syntax vector and the sampled semantics vector through a decoder neural network to compose a new sentence.

2. The system as claimed in claim 1, wherein the at least one processor is configured to:
    receive a semantics input value defining a variation parameter used to vary the original sentence.

3. The system as claimed in claim 2, wherein the semantics input value comprises at least one of:
    a sentiment value; or a topic value.

4. The system as claimed in claim 3, wherein the at least one processor is configured to:
    display options for the sentiment value and the topic value.

5. The system as claimed in claim 4, wherein the at least one processor is configured to:
    output the new sentence.

6. The system as claimed in claim 1, wherein the at least one processor is configured to:
    receive a plurality of training sentence structures; and
    for each training sentence structure:
        process that training sentence structure through an encoder neural network to decompose that training sentence structure into a training semantics component and a training syntax component;

process the training syntax component through the syntax VAE to receive a training syntax mean vector and a training syntax covariance matrix;

obtain a training sampled syntax vector from a syntax Gaussian posterior parameterized by the training syntax mean vector and the training syntax covariance matrix;

process the training semantics component through the semantics VAE to receive a training semantics mean vector and a training semantics covariance matrix;

obtain a training sampled semantics vector from a semantics Gaussian posterior parameterized by the training semantics mean vector and the training semantics covariance matrix;

determine a reconstruction loss value for the training sentence using the sampled syntax vector and the sampled semantics vector; and determine a reconstruction loss value, a KL divergence value, a regularization loss value and a structured reconstruction loss value; and apply optimization methods over iterations of each training sentence to determine the simplex.

7. The system as claimed in claim 6, wherein the at least one processor is configured to:

display classification groupings associated with aggregate loss values of each reconstructed training sentence; and assign a label for each classification grouping.

8. The system as claimed in claim 6, wherein the classification groupings comprise at least one of: sentence sentiment or sentence topic.

9. A computer-implemented method for machine text generation, the method comprising:

processing an original sentence structure through an encoder neural network to decompose the original sentence structure into an original semantics component and an original syntax component;

processing the original syntax component through a syntax variational autoencoder (VAE) to receive a syntax mean vector and a syntax covariance matrix;

obtaining a sampled syntax value from a syntax Gaussian posterior parameterized by the syntax mean vector and the syntax covariance matrix;

processing the original semantics component through a semantics VAE to receive a semantics mean vector and a semantics covariance matrix, the semantics mean vector constrained to be on or inside a simplex associated with a semantics Gaussian posterior and learned during training of a sentence model;

obtaining a sampled semantics vector from the Gaussian semantics posterior parameterized by the semantics mean vector and the semantics covariance matrix; and processing the sampled syntax vector and the sampled semantics vector through a decoder neural network to compose a new sentence.

10. The method as claimed in claim 9, comprising:

receiving a semantics input value defining a variation parameter used to vary the original sentence.

11. The method as claimed in claim 10, wherein the semantics input value comprises at least one of:

a sentiment value; or a topic value.

12. The method as claimed in claim 11, comprising:

display options for the sentiment value and the topic value.

13. The method as claimed in claim 12, comprising:

output the new sentence.

14. The method as claimed in claim 9, comprising:

receiving a plurality of training sentence structures; and for each training sentence structure:

processing that training sentence structure through an encoder neural network to decompose that training sentence structure into a training semantics component and a training syntax component;

processing the training syntax component through the syntax VAE to receive a training syntax mean vector and a training syntax covariance matrix;

obtaining a training sampled syntax vector from a syntax Gaussian posterior parameterized by the training syntax mean vector and the training syntax covariance matrix;

processing the training semantics component through the semantics VAE to receive a training semantics mean vector and a training semantics covariance matrix;

obtaining a training sampled semantics vector from a semantics Gaussian posterior parameterized by the training semantics mean vector and the training semantics covariance matrix;

determining a reconstruction loss value for the training sentence using the sampled syntax vector and the sampled semantics vector; and determining a reconstruction loss value, a KL divergence value, a regularization loss value and a structured reconstruction loss value; and applying optimization methods over iterations of each training sentence to determine the simplex.

15. The method as claimed in claim 14, comprising:

displaying classification groupings associated with aggregate loss values of each reconstructed training sentence; and assigning a label for each classification grouping.

16. The method as claimed in claim 15, wherein the classification groupings comprise at least one of: sentence sentiment or sentence topic.

* * * * *